United States Patent
Nakagawa et al.

(10) Patent No.: US 12,524,979 B2
(45) Date of Patent: Jan. 13, 2026

(54) INFORMATION PROCESSING APPARATUS, INFORMATION PROCESSING METHOD, AND INFORMATION PROCESSING SYSTEM

(71) Applicant: SONY GROUP CORPORATION, Tokyo (JP)

(72) Inventors: Yusuke Nakagawa, Tokyo (JP); Taha Moriyama, Tokyo (JP); Masanori Okazaki, Tokyo (JP); Osamu Ito, Tokyo (JP); Yohei Fukuma, Tokyo (JP); Ayumi Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 164 days.

(21) Appl. No.: 18/550,341

(22) PCT Filed: Feb. 8, 2022

(86) PCT No.: PCT/JP2022/004821
§ 371 (c)(1),
(2) Date: Sep. 13, 2023

(87) PCT Pub. No.: WO2022/201922
PCT Pub. Date: Sep. 29, 2022

(65) Prior Publication Data
US 2024/0161438 A1 May 16, 2024

(30) Foreign Application Priority Data
Mar. 25, 2021 (JP) .................. 2021-051638

(51) Int. Cl.
*G06T 19/20* (2011.01)
*G06F 3/01* (2006.01)
*G06T 19/00* (2011.01)

(52) U.S. Cl.
CPC .............. *G06T 19/20* (2013.01); *G06F 3/016* (2013.01); *G06T 19/006* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

2017/0011602 A1* 1/2017 Brav .................. H04W 4/80

FOREIGN PATENT DOCUMENTS

| JP | 2001-166676 A | 6/2001 |
| JP | 2002-182817 A | 6/2002 |

(Continued)

OTHER PUBLICATIONS

Hirao, et al., "T-01A: Proposal and evaluation of weight sensation presentation method by visual and deep sense cross-modal", Proceedings of the Annual Conference of the Virtual Reality Society of Japan, Sep. 27, 2017, pp. 1-4.

(Continued)

*Primary Examiner* — Robert J Craddock
(74) *Attorney, Agent, or Firm* — CHIP LAW GROUP

(57) ABSTRACT

There is provided an information processing apparatus including an information acquisition unit that acquires operation information concerning user operation performed a virtual object superimposed and displayed on a real space or a virtual space and a sense of force control unit that outputs, based on the operation information, via a sense-of-force device attached to a part of a body of a user, a sense of force for causing the user to recognize weight.

18 Claims, 26 Drawing Sheets

(56) References Cited

FOREIGN PATENT DOCUMENTS

JP      2011-059862 A      3/2011
WO    2009/035100 A1    3/2009

OTHER PUBLICATIONS

International Search Report and Written Opinion of PCT Application No. PCT/JP2022/004821, issued on May 17, 2022, 10 pages of ISRWO.

* cited by examiner

FIG.9
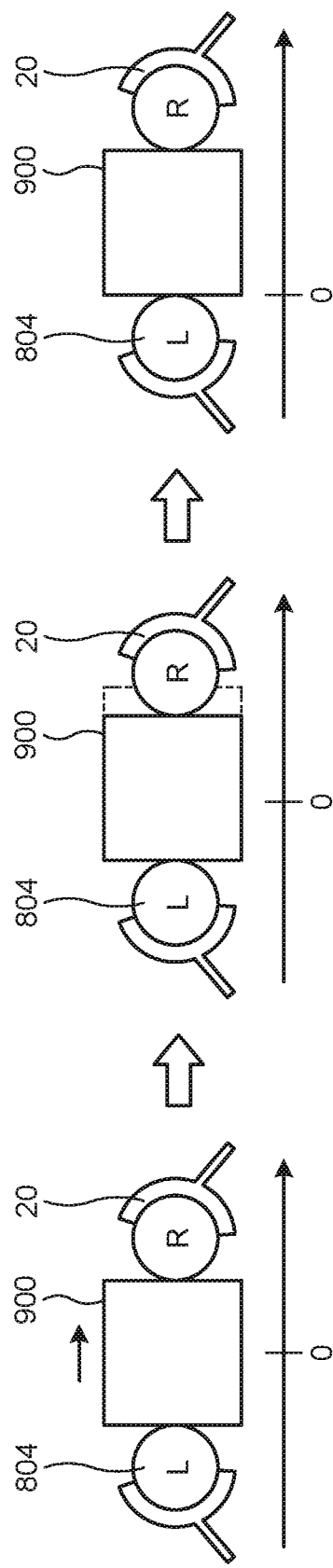
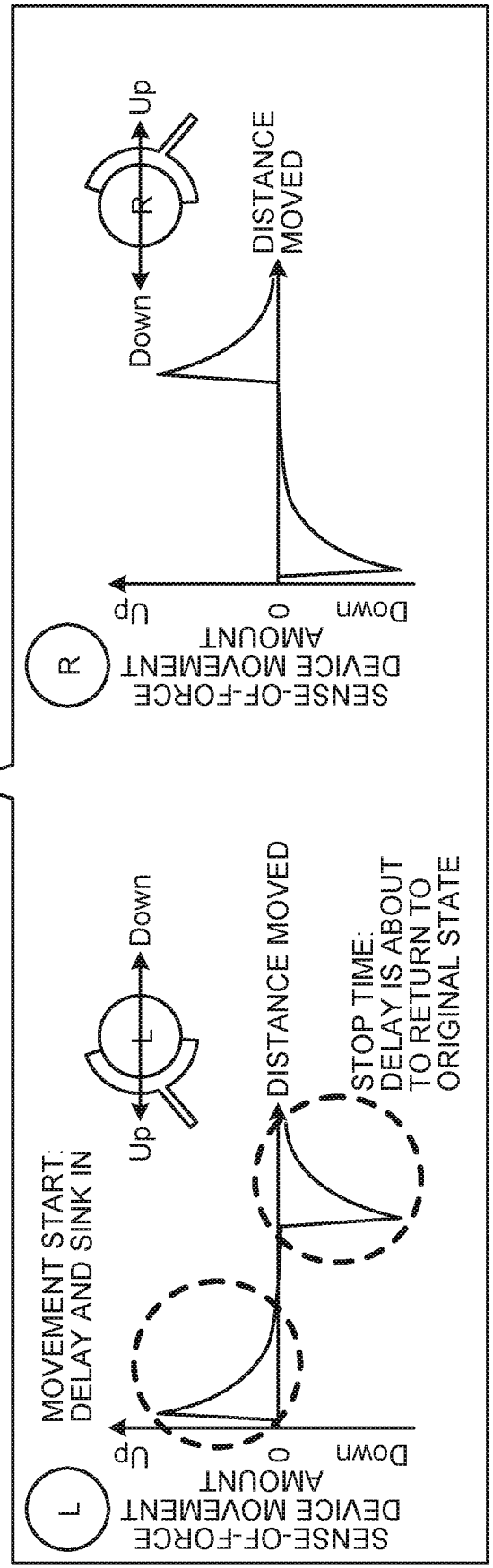

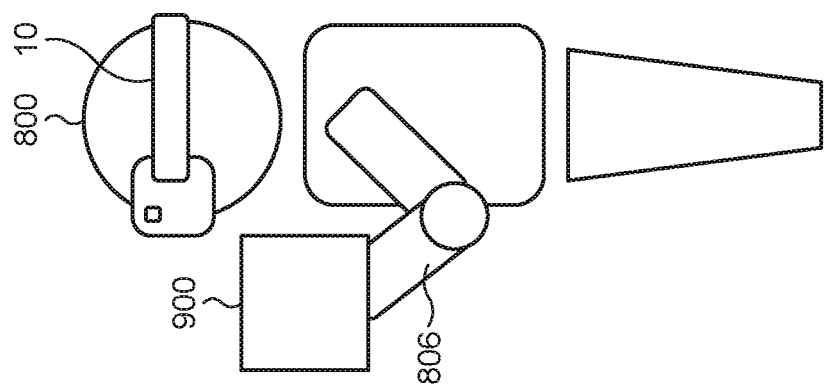
FIG. 14
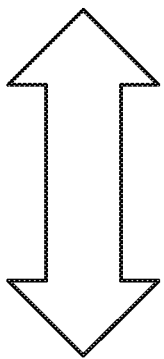
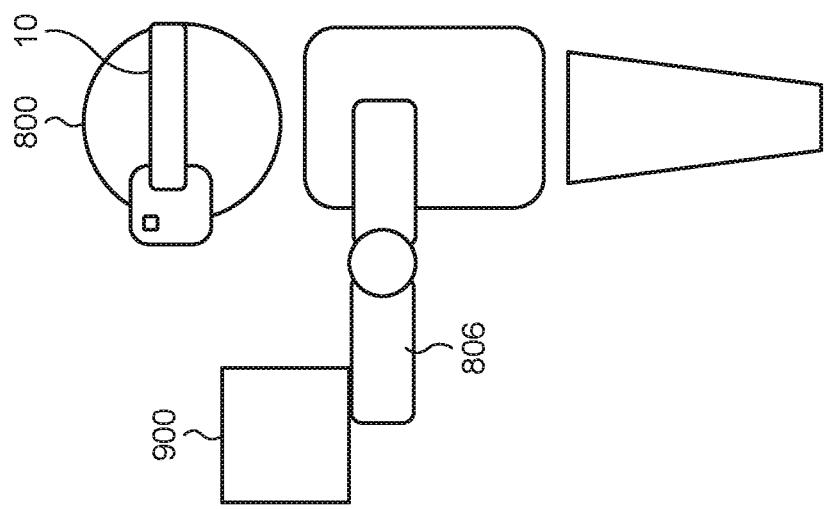

FIG.16
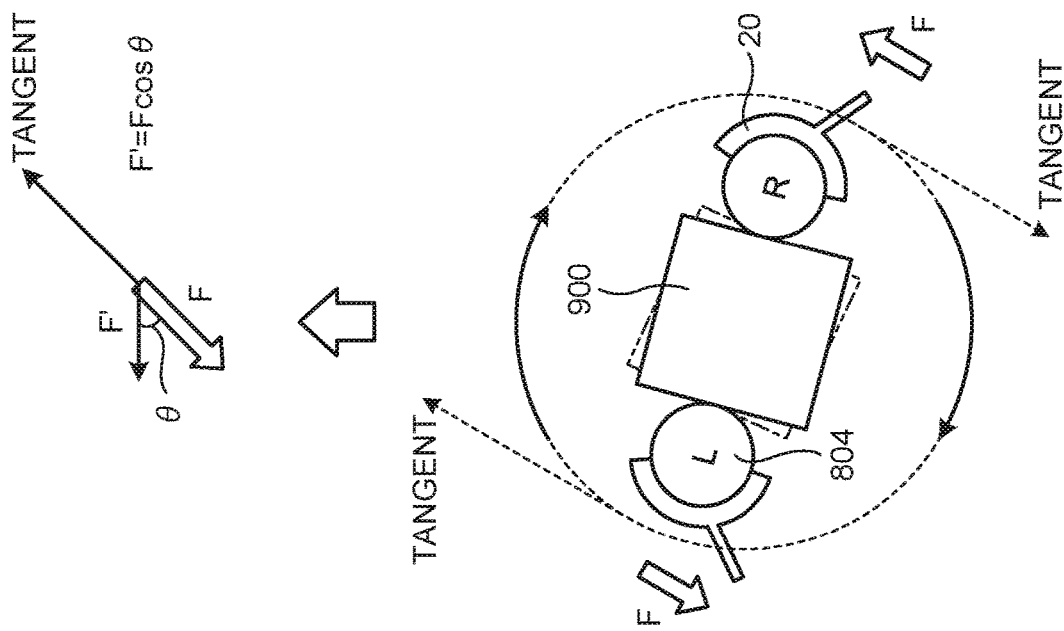
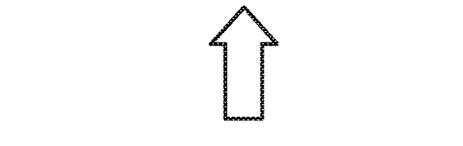
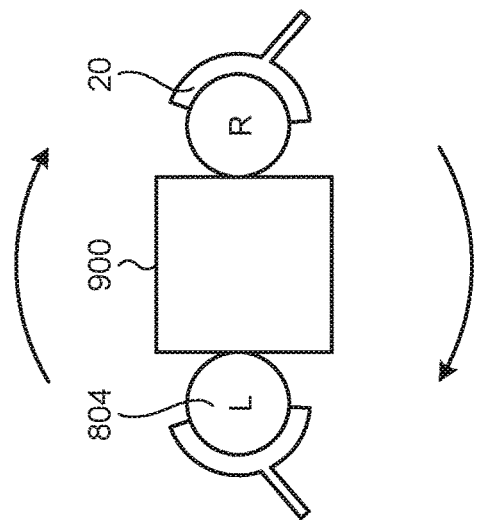

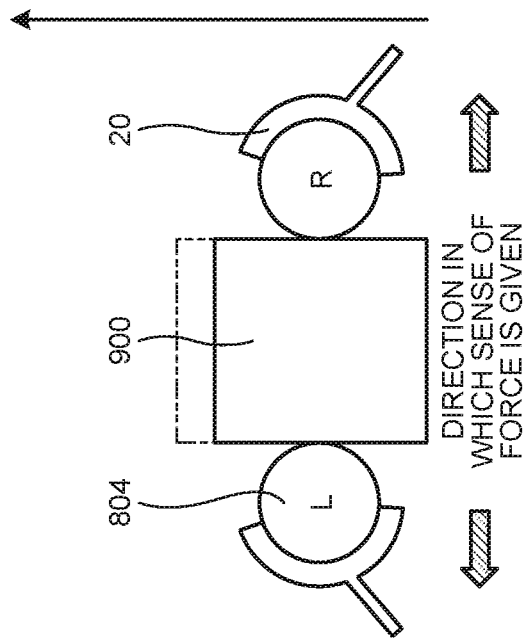
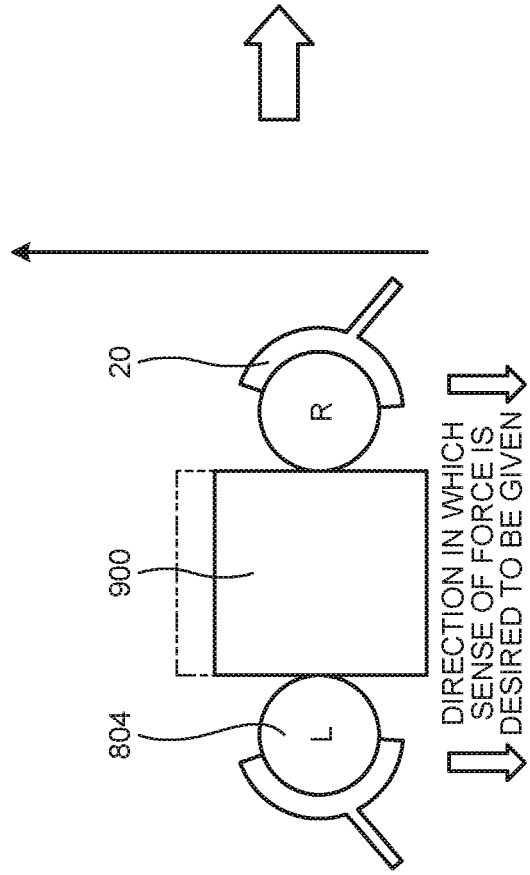
FIG.17

FIG.18
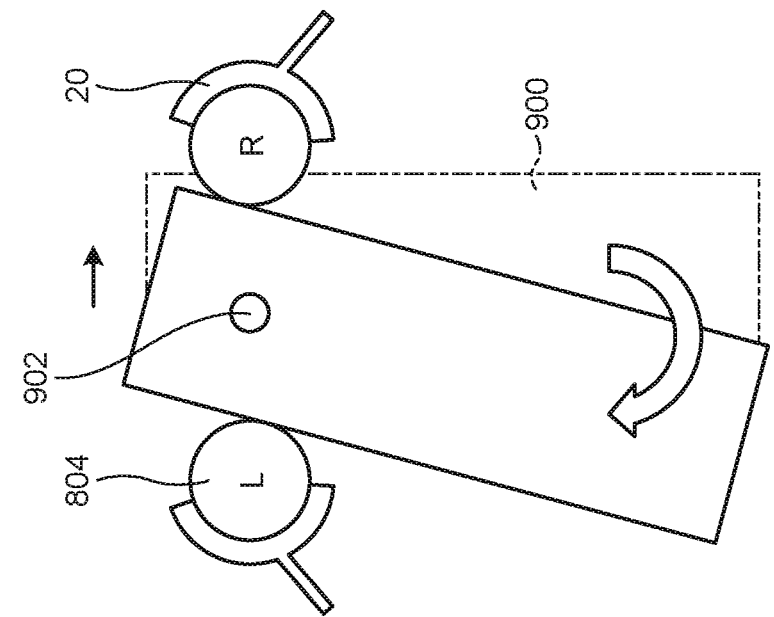
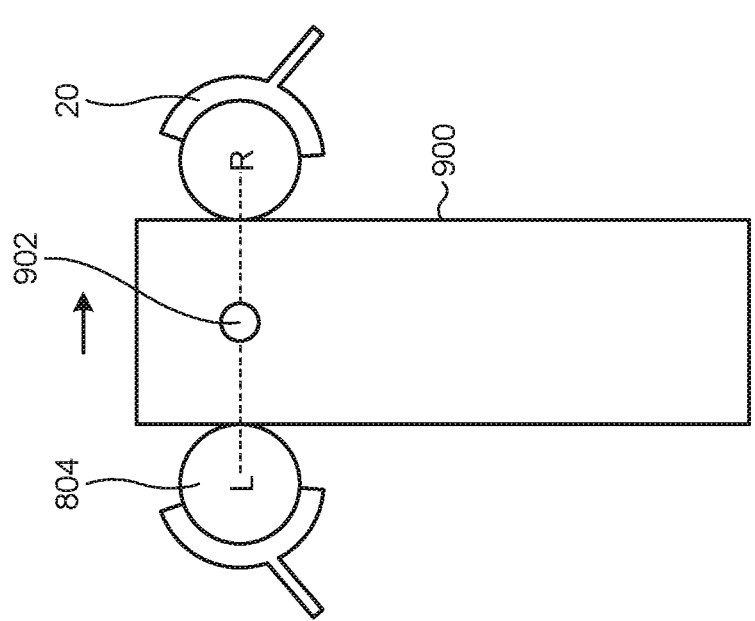

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2022/004821 filed on Feb. 8, 2022, which claims priority benefit of Japanese Patent Application No. JP 2021-051638 filed in the Japan Patent Office on Mar. 25, 2021. Each of the above-referenced applications is hereby incorporated herein by reference in its entirety.

FIELD

The present disclosure relates to an information processing apparatus, an information processing method, and an information processing system.

BACKGROUND

In recent years, technologies related to virtual reality (VR) and augmented reality (AR) have been widespread as technologies for realizing realistic experiences. The virtual reality (VR) is a technology for providing a virtual world involving a sense of reality for a user. On the other hand, the augmented reality (AR) is a technology for expanding a real space environment around a user and, in general, is realized by superimposing and displaying virtual objects on a real space. In content of such VR or AR, for example, it can be considered that presenting a sense of force involving contact when the user stretches out a hand and touches a virtual object, which is a virtual substance, is an important element for reproducing the reality of the virtual object.

CITATION LIST

Patent Literature

Patent Literature 1: JP 2002-182817 A

SUMMARY

Technical Problem

However, in the provision of the content of the VR or the AR in the past, since there is a restriction on a range and a form of a sense of force that can be presented by a sense-of-force device, there is a limit in improving the reproducibility of the reality of the virtual object.

Therefore, the present disclosure proposes an information processing apparatus, an information processing method, and an information processing system that can improve reproducibility of reality of a virtual object.

Solution to Problem

According to the present disclosure, there is provided an information processing apparatus including: an information acquisition unit that acquires operation information concerning user operation performed on a virtual object superimposed and displayed on a real space or a virtual space; and a sense of force control unit that outputs, based on the operation information, via a sense-of-force device attached to a part of a body of a user, a sense of force for causing the user to recognize weight.

Furthermore, according to the present disclosure, there is provided an information processing method including: acquiring operation information concerning user operation performed on a virtual object superimposed and displayed on a real space or a virtual space; and outputting, based on the operation information, via a sense-of-force device attached to a part of a body of a user, a sense of force for causing the user to recognize weight, by an information processing apparatus.

Furthermore, according to the present disclosure, there is provided an information processing system including: an information acquisition device that acquires operation information concerning user operation performed on a virtual object superimposed and displayed on a real space or a virtual space; and a sense of force control device that outputs, based on the operation information, via a sense-of-force device attached to a part of a body of a user, a sense of force for causing the user to recognize weight.

BRIEF DESCRIPTION OF DRAWINGS

FIG. 9 is an explanatory diagram (No. 1) for explaining imparting of a delay according to the embodiment of the present disclosure.

FIG. 14 is an explanatory diagram (No. 4) for explaining the method of determining a delay amount according to the embodiment of the present disclosure.

FIG. 16 is an explanatory diagram (No. 6) for explaining the method of determining a delay amount according to the embodiment of the present disclosure.

FIG. 17 is an explanatory diagram (No. 7) for explaining the method of determining a delay amount according to the embodiment of the present disclosure.

FIG. 18 is a diagram illustrating an example of display of a virtual object 900 according to the embodiment of the present disclosure.

DESCRIPTION OF EMBODIMENTS

Figure 1:
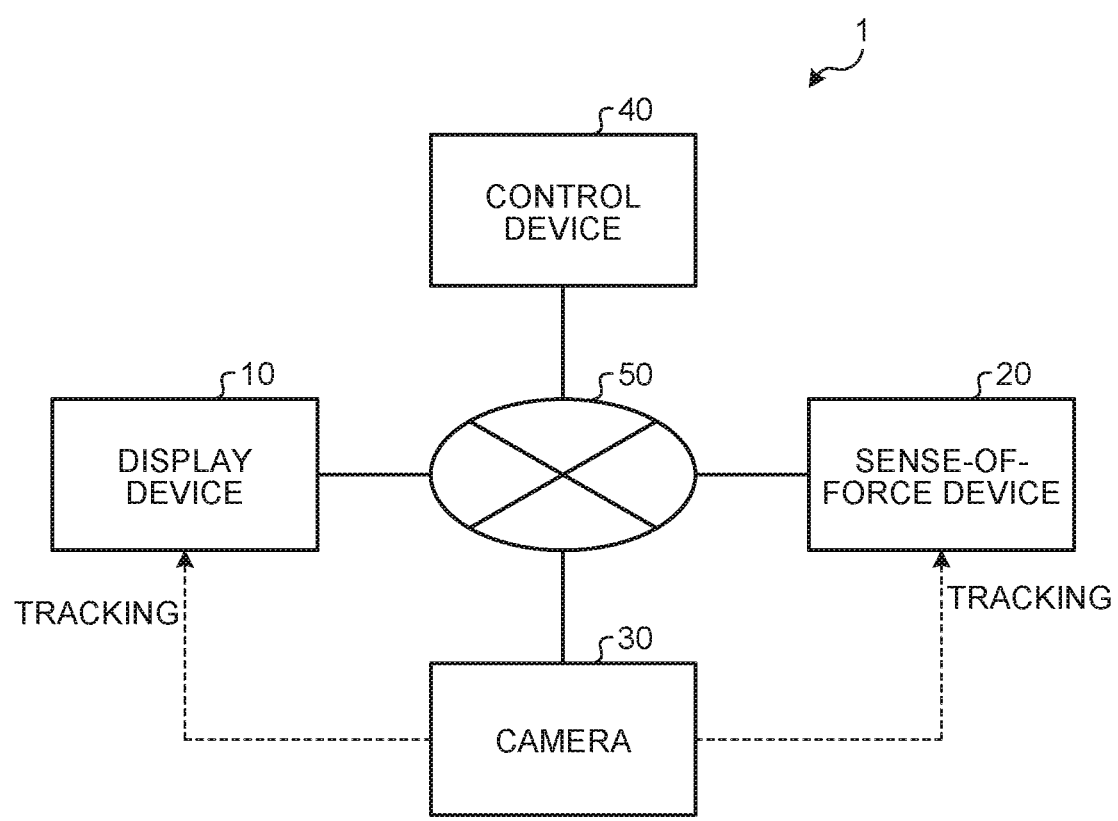
FIG. 1 is a system diagram illustrating a schematic configuration of a presentation system 1 according to an embodiment of the present disclosure.

Preferred embodiments of the present disclosure are explained in detail below with reference to the accompanying drawings. Note that, in the present specification and the drawings, components having substantially the same functional configurations are denoted by the same reference numerals and signs, whereby redundant explanation of the components is omitted. In addition, in the present specification and the drawings, a plurality of components having substantially the same or similar functional configurations are sometimes distinguished by attaching different alphabets after the same reference numerals. However, when it is not particularly necessary to distinguish each of the plurality of components having substantially the same or similar functional configurations, only the same reference numerals and signs are attached.

Note that, in the following explanation, a virtual object means a virtual object that can be perceived by a user like a real object existing in a real space. For example, the virtual object can have various forms such as an icon and an animation.

Further, the description will be given in the following order.

1. Background leading to creation of an embodiment of the present disclosure
 1.1 Schematic configuration of a presentation system 1
 1.2 Background
2. Embodiment
 2.1 Detailed Configuration of a control device 40
 2.2 Giving a specific delay
 2.3 Delay amount
 2.4 Display
 2.5 Other modals
 2.6 Other operation
 2.7 Control method
3. Summary
4. Hardware configuration
5. Supplement 1. Background Leading to Creation of an Embodiment of the Present Disclosure First, before an embodiment of the present disclosure is explained, a background leading to creation of an embodiment of the present disclosure by the present inventors is explained. In the present disclosure, as explained above, a technology concerning provision of content in VR or AR and for further improving reality of a virtual object presented in such content is proposed.

<1.1 Schematic Configuration of a Presentation System 1>

Figure 2:
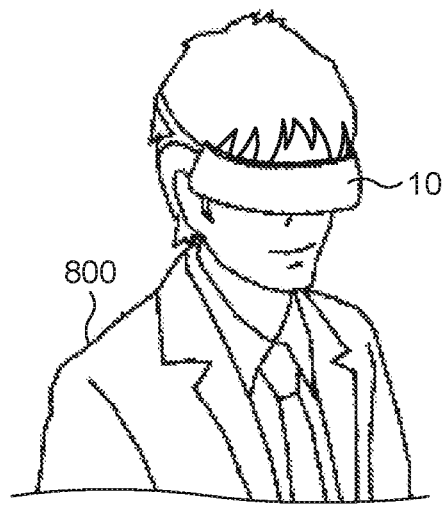
FIG. 2 is a diagram illustrating an example of an external configuration of a display device 10 according to the embodiment of the present disclosure.
Figure 3:
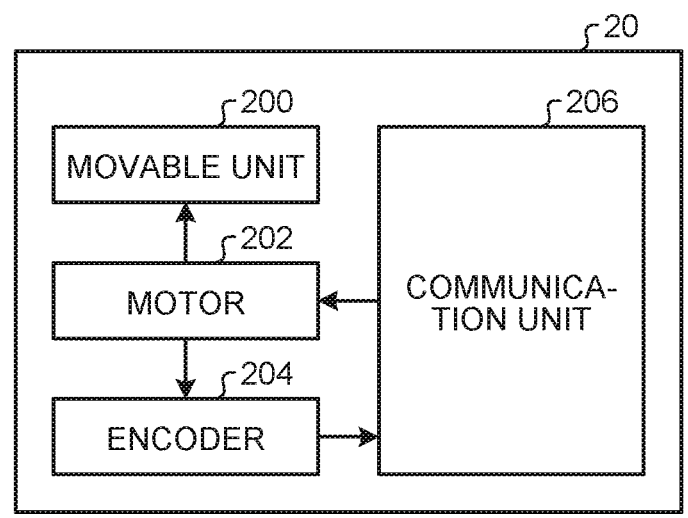
FIG. 3 is a diagram illustrating an example of a functional block configuration of a sense-of-force device 20 according to the embodiment of the present disclosure.
Figure 4:
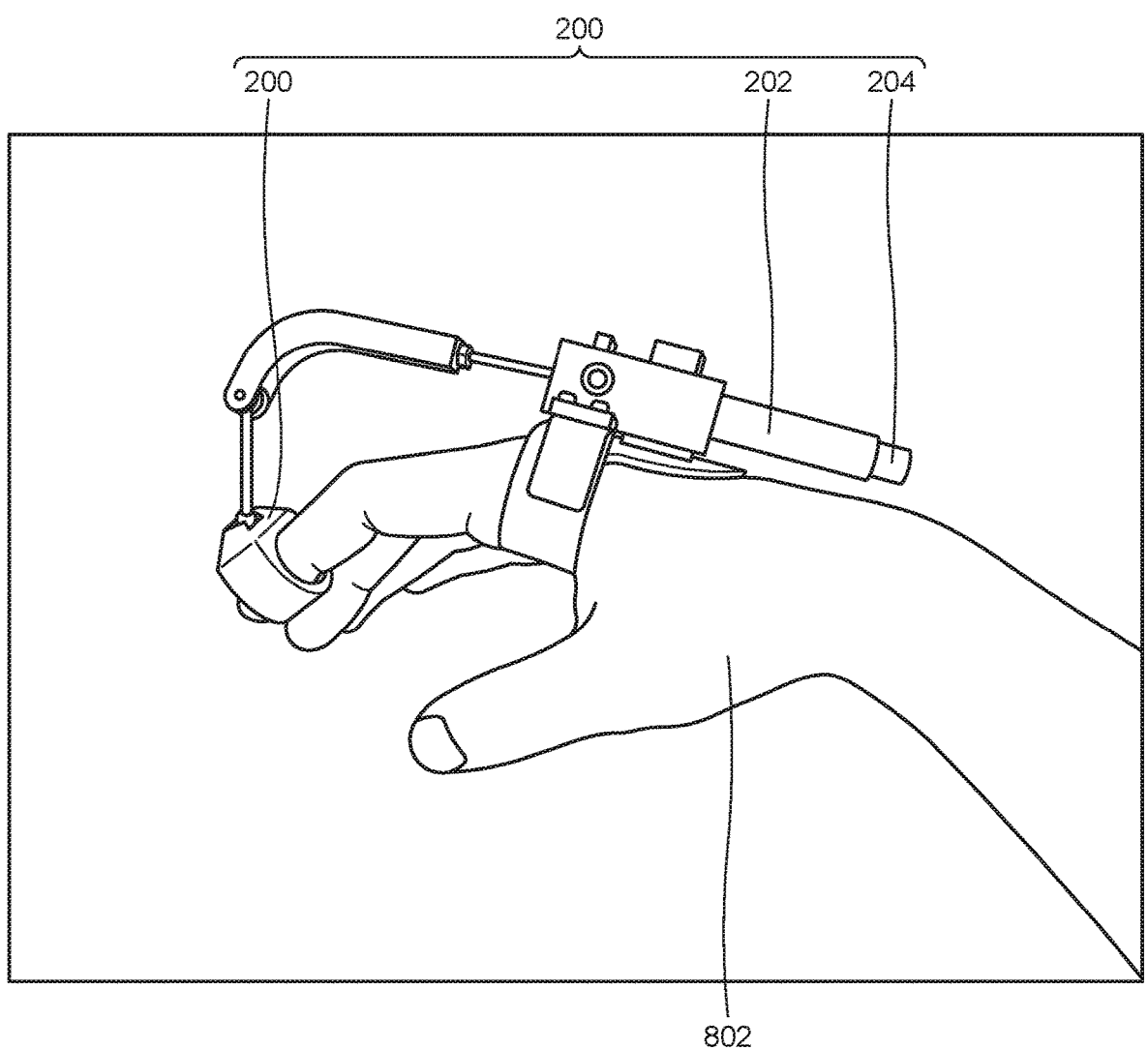
FIG. 4 is a diagram (No. 1) illustrating an example of an exterior configuration of the sense-of-force device 20 according to the embodiment of the present disclosure.
Figure 5:
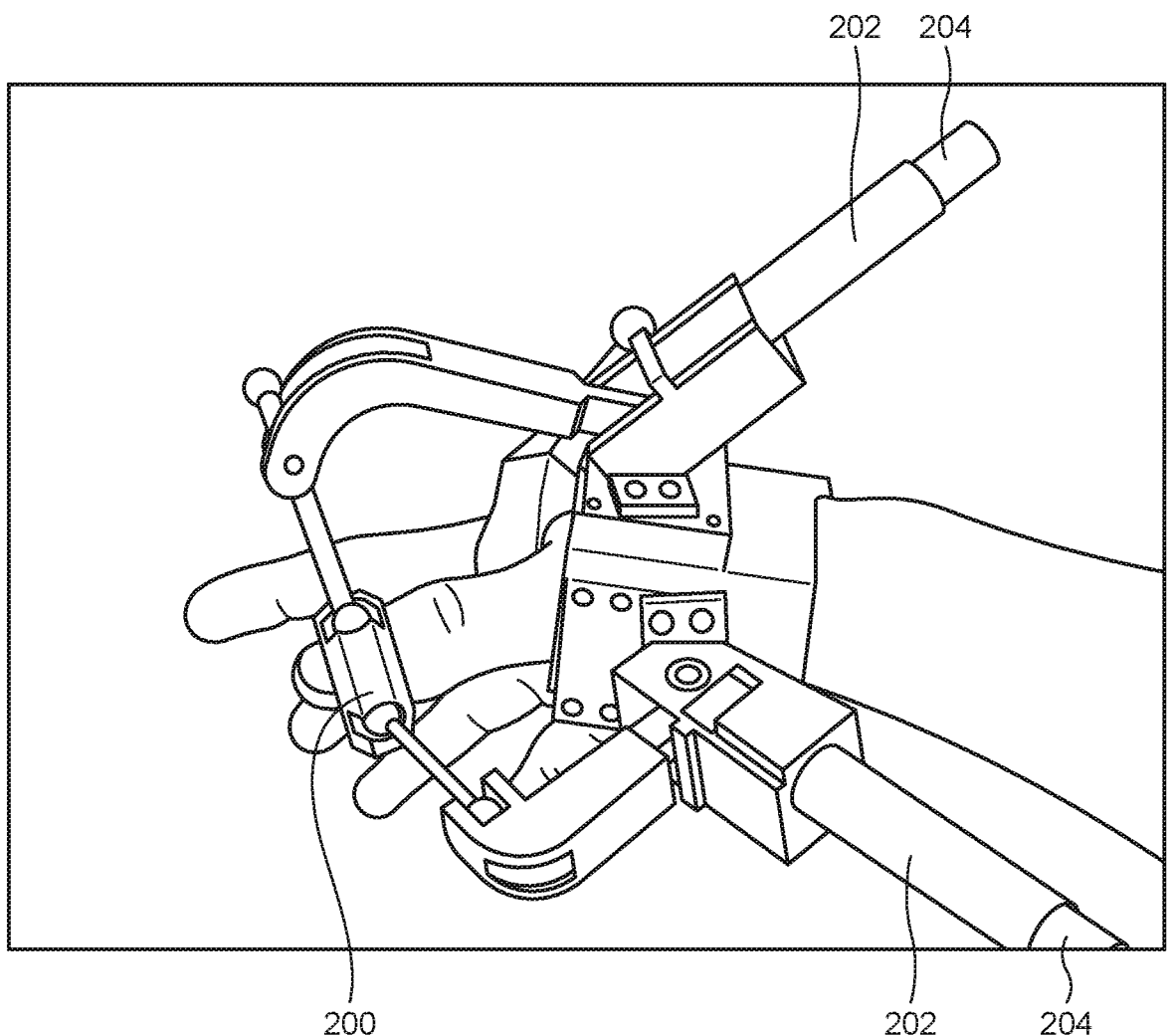
FIG. 5 is a diagram (No. 2) illustrating an example of an exterior configuration of the sense-of-force device 20 according to the embodiment of the present disclosure.
Figure 6:
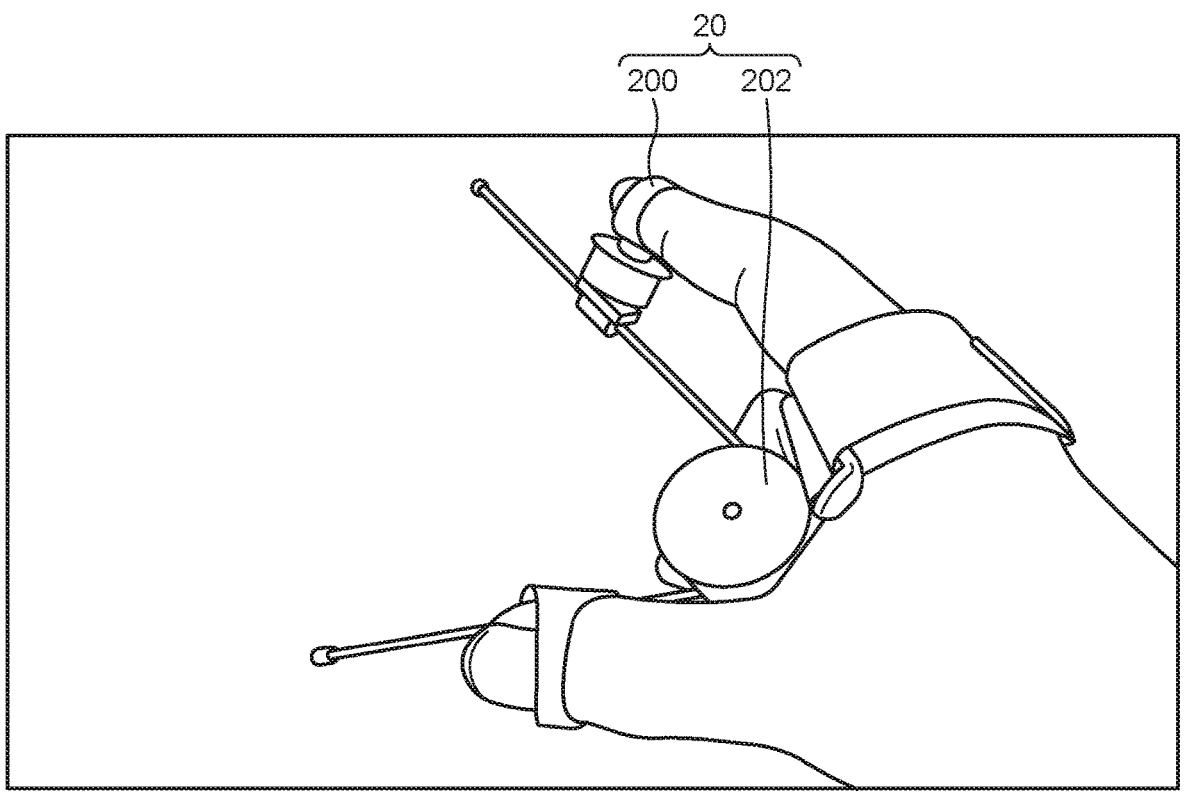
FIG. 6 is a diagram (No. 3) illustrating an example of an exterior configuration of the sense-of-force device 20 according to the embodiment of the present disclosure.

First, a schematic configuration of a presentation system (an information processing system) 1 according to an embodiment of the present disclosure that provides content of VR or AR is explained with reference to FIG. 1 to FIG. 6. FIG. 1 is a system diagram illustrating a schematic configuration of presentation system 1 according to the present embodiment. FIG. 2 is a diagram illustrating an example of an exterior configuration of a display device 10 according to the embodiment of the present disclosure. FIG. 3 is a diagram illustrating an example of a functional block configuration of a sense-of-force device 20 according to the present embodiment. FIG. 4 to FIG. 6 are diagrams illustrating an example of an exterior configuration of the sense-of-force device 20 according to the present embodiment.

As illustrated in FIG. 1, the presentation system 1 according to the present embodiment can include, for example, a display device 10, a sense-of-force device 20, a camera 30, and a control device 40. The display device 10, the sense-of-force device 20, the camera 30, and the control device (an information processing apparatus) 40 can communicate with one another via various wired or wireless networks 50. Note that, as a communication scheme used in a network 50, any scheme can be applied irrespective of whether the scheme is wired or wireless (for example, WiFi (registered trademark) or Bluetooth (registered trademark)). However, it is desirable to use a communication scheme that can maintain a stable operation. The display device 10, the sense-of-force device 20, and the camera 30 included in the presentation system 1 are not limited to numbers illustrated in FIG. 1 and may be included in larger numbers. In the following explanation, an overview of the devices included in the presentation system 1 according to the present embodiment is explained.

(Display Device 10)

For example, the display device 10 can display, for example, according to control from the control device 40 explained below, together with an image or the like of a real space or a virtual space, a virtual object virtually disposed in the real space with respect to a user or a virtual object disposed in the virtual space. Specifically, the display device 10 can be realized by, for example, a glasses-type HMD (Head Mounted Display) worn on the head of a user 800 illustrated in FIG. 2. A display unit (not illustrated) equivalent to a spectacle lens portion located in front of the eyes of the user 800 during the wearing is a transmissive display in which the outer side of the spectacle lens portion can be visually recognized or a non-transmissive type display in which the outer side of the spectacle lens portion cannot be visually recognized. The display unit can display a virtual object. When the HMD has an optical see-through or video see-through function, the HMD can be a display device for realizing sharing of an AR space. For example, when the HMD includes the non-transmissive display, an image of a real space present around the user 800 captured by a camera (not illustrated) that is loaded on the HMD and images the periphery of the user 800 can be displayed on the non-transmissive display (video see-through). Further, the HMD may be loaded with a speaker (not illustrated), an IMU (Inertial Measurement Unit) (not illustrated), a sound sensor (not illustrated), a line-of-sight sensor (not illustrated), a biological information sensor (not illustrated), and the like.

In the embodiment of the present disclosure, the display device 10 is not limited to the HMD and may be, for example, a tablet terminal (not illustrated) or a smartphone (not illustrated) held by the user 800, a projector (not illustrated) installed in a real space where the user is present, a display (not illustrated), or the like.

(Sense-of-Force Device 20)

The sense-of-force device 20 is a non-grounded sense-of-force device and is, for example, worn on a finger of the user 800 or carried by the user 800 and can give a sense of force to the finger (a part of the body) of the user 800. In the present embodiment, for example, the sense-of-force device 20 is explained as being an exoskeleton type device illustrated in FIG. 4 that is worn on a finger of the user 800 and gives a sense of force to the finger of the user 800.

For example, as illustrated in FIG. 3, the sense-of-force device 20 mainly includes, as functional blocks, a movable unit 200, a motor 202, an encoder 204, and a communication unit 206. The sense-of-force device 20 can give a sense of force to the fingers of the user 800 according to control from the control device 40 explained below. In the following explanation, functional blocks of the sense-of-force device 20 are sequentially explained.

The movable unit 200 is attached to, for example, a fingertip, a joint, or the like of the user 800 to fix movement of the fingertip or the like of the user 800 or move the fingertip or the like with the motor 202 explained below to thereby be able to give a sense of force to a finger of the user 800. For example, the movable unit 200 may be configured to rotate centering on one axis (one degree of freedom) or may be configured to rotate centering on two axes crossing perpendicularly each other (two degrees of freedom). Further, the movable unit 200 may include a cap (not illustrated) that covers the fingertip of the user 800 and a band (not illustrated) for fixing the movable unit 200 to the finger of the user 800.

A vibration device (not illustrated) that applies vibration to the finger of the user 800, an electrical stimulation device (not illustrated) that applies electrical stimulation to the finger of the user 800, a pressure application device (not illustrated) that applies pressure to the finger of the user 800, or the like may be provided at a part of the movable unit 200 that comes into contact with the finger or the like of the user 800. Note that, in the present embodiment explained below, it is assumed that the vibration device is provided in the sense-of-force device 20. Further, in the movable unit 200, an IMU (not illustrated) for detecting the position and movement of the movable unit 200, a pressure sensor (not illustrated) for detecting pressure applied to the finger or the like of the user 800, or the like may be provided.

The motor 202 includes, for example, a DC motor that rotates with a DC power supply and can move the movable unit 200 explained above along a predetermined axis by rotating to thereby be able to give a sense of force to the finger of the user 800. Specifically, for example, the motor 202 can rotate according to a command for instructing a position from the control device 40 explained below such that the movable unit 200 moves to the position. Alternatively, the motor 202 can rotate according to a command for instructing torque from the control device 40 such that the torque is applied to a part of the movable unit 200 that comes into contact with the finger or the like of the user 800.

The encoder 204 can detect a rotation amount of the motor 202 and can output a result of the detection to the control device 40 explained below. Then, the control device 40 can control the motor 202 based on the detection result (feedback). Note that, in the present embodiment, a potentiometer (not illustrated) or the like may be used instead of the encoder 204 to detect a rotation amount of the motor 202.

The communication unit 206 can transmit and receive information to and from an external device such as the control device 40. In other words, the communication unit 206 is considered a communication interface having a function of transmitting and receiving data and is implemented by a communication device such as a transmission and reception circuit or a port.

Further, the exterior of the sense-of-force device 20 is explained. The sense-of-force device 20 can be, for example, an exoskeleton type device illustrated in FIG. 4 that can move the fingertip of the index finger of a hand 802 of the user 800 to draw a circumference centering on one axis (one degree of freedom). Specifically, in the sense-of-force device 20 illustrated in FIG. 4, the movable unit 200 capable of giving a sense of force to the fingertip of the index finger is attached and the movable unit 200 can be fixed or moved by the motor 202 connected to the movable unit 200. A rotation amount of the motor 202 is detected by the encoder 204 connected to the motor 202 and output to the control device 40.

The sense-of-force device 20 can be an exoskeleton type device illustrated in FIG. 5 capable of moving the fingertip of the thumb to draw circumferences centering on two axes perpendicular to each other (two degrees of freedom). In the sense-of-force device 20 illustrated in FIG. 5, the movable unit 200 capable of giving a sense of force to the fingertip of the thumb is attached and the movable unit 200 can be moved by each of two motors 202 connected to the movable unit 200 to draw circumferences around two axes (two degrees of freedom).

In the present embodiment, the sense-of-force device 20 is not limited to be an exoskeleton type device that covers the hand 802 of the user 800 and may be, for example, a supported-type device supported by the palm of the user 800. For example, as illustrated in FIG. 6, the sense-of-force device 20 includes a cylindrical member supported on the inside of the palm of the user 800 and two axial members connected to the cylindrical member. The axial members are respectively connected to movable units 200 at the fingertips of the index finger and the thumb of the user 800. Each of the axial members is rotated by the motor 202 located inside the cylindrical member, whereby each of the fingertips of the index finger and the thumb of the user 800 rotates centering on the axis of the cylindrical member (one degree of freedom). Note that, in the present embodiment, the sense-of-force device 20 may be, for example, a supported-type device capable of moving each of the fingertips of the thumb and the forefinger to draw circumferences centering on two axes perpendicular to each other (two degrees of freedom).

Note that, in the present embodiment, the sense-of-force device 20 is not limited to the exoskeleton type device and the supported-type device illustrated in FIG. 3 to FIG. 6 and may be a device of another form. That is, in the present embodiment, the sense-of-force device may be a sense-of-force device of any form if the sense-of-force device can give, to the user 800, a sense of force that makes the user feel as if the user has performed the same operation on an actually present real object when the user performs an action such as grasping, touching (tapping), or stroking on a virtual object.

(Camera 30)

The camera 30 includes one or a plurality of visible light cameras (not illustrated) that images the user 800 from one viewpoint or multiple viewpoints and can output sensing data obtained by imaging to the control device 40. More specifically, for example, the camera 30 can detect the positions and the postures of the display device 10 and the sense-of-force device 20 by tracking markers attached to the display device 10 and the sense-of-force device 20 worn on a part of the body of the user 800. Further, the camera 30 may image a real space present around the user 800. The camera 30 is not limited to be the visible light camera and may be an infrared (IR) camera or may be a depth sensor.

In the present embodiment, the position and the posture of the sense-of-force device 20 may be detected using, instead of the camera 30, an IMU (not illustrated) loaded on the sense-of-force device 20 worn on a part of the body of the user 800. For example, the IMU can include an acceleration sensor (not illustrated), an angular velocity sensor (not illustrated), or a gyro sensor (not illustrated).

Further, the presentation system 1 according to the present embodiment may include a position sensor (not illustrated) that senses the position of the user 800, a sound sensor (not illustrated) that senses voice of the user 800 and ambient environmental sound around the user 800, an air pressure sensor (not illustrated) that measures the environment around the user 800, and a wind force sensor (not illustrated).

More specifically, for example, the position sensor explained is a sensor that senses the position of the user 800 and can be a GNSS (Global Navigation Satellite System) receiver or the like. In this case, the position sensor acquires, based on a signal from a GNSS satellite, sensing data indicating information concerning latitude/longitude (position information in a global coordinate system) of the current location of the user 800. For example, access points of RFID (Radio Frequency Identification) and Wi-Fi can sense a relative positional relationship of the user 800 from, for example, information concerning a radio base station. Therefore, in the present embodiment, such a communication device may be used as the position sensor.

(Control Device 40)

The control device 40 can integrally control operations of the display device 10 and the sense-of-force device 20 and is implemented by, for example, a processing circuit such as a CPU (Central Processing Unit) or a GPU (Graphics Processing Unit). Note that a detailed configuration of the control device 40 according to the present embodiment is explained below.

Note that, in the embodiment of the present disclosure, a configuration of the presentation system 1 is not limited to the configuration illustrated in FIG. 1 and may include other devices and the like.

<1.2 Background>

Figure 7:
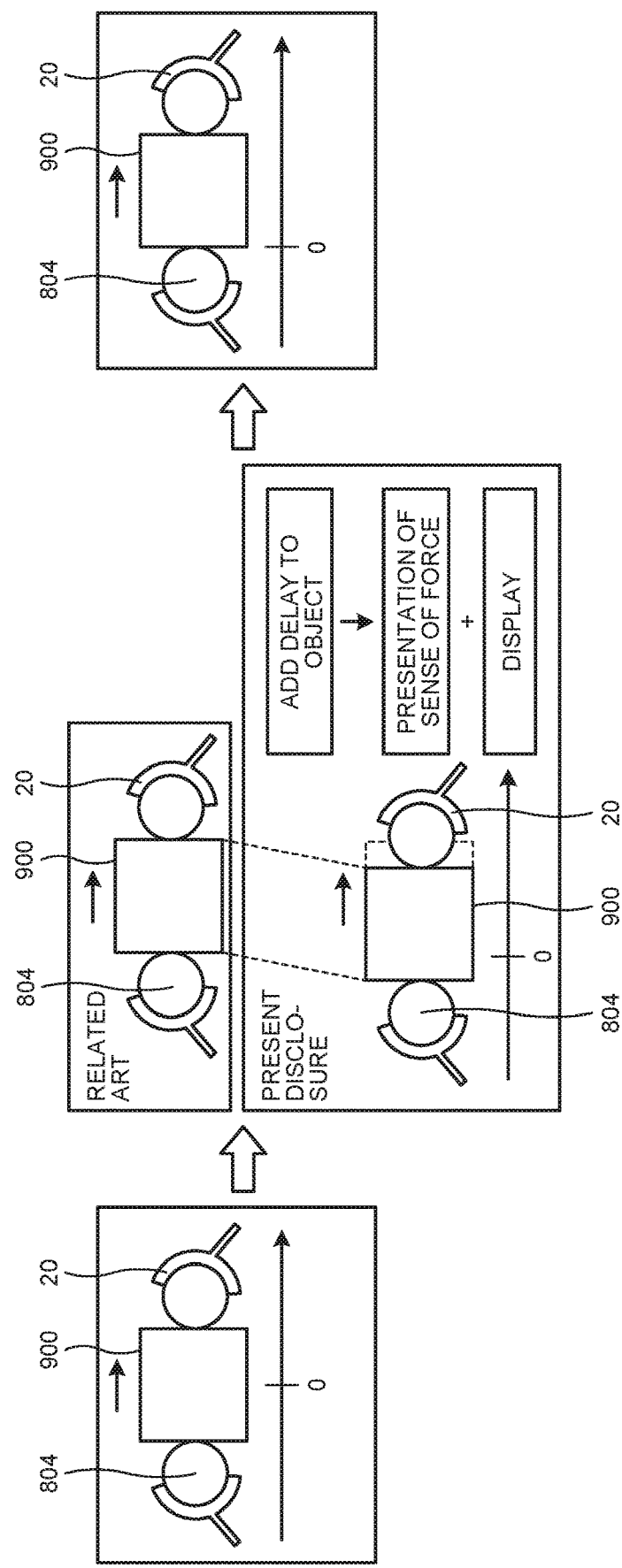
FIG. 7 is an explanatory diagram for explaining sense of force presentation in related art and the embodiment of the present disclosure.

Next, sense of force presentation in the presentation system 1 explained above is explained with reference to FIG. 7. FIG. 7 is an explanatory diagram for explaining sense of force presentation according to the related art and the embodiment of the present disclosure. FIG. 7 illustrates, as an example, a flow of an operation in the case in which the user 800 grasps a virtual object 900 with fingers 804.

Specifically, a case in which the user 800 grasps the virtual object 900 with two fingers 804 on which sense-of-force devices 20 are worn is explained. First, as illustrated on the left side of FIG. 7, the user 800 moves the finger 804 illustrated on the left side in the right direction and, while moving the virtual object 900 to the right side, presses the virtual object 900 against the finger 804 illustrated on the right side to sandwich the virtual object 900.

At this time, in the related art, as illustrated in the upper center of FIG. 7 and the right side of FIG. 7, at timing when the two fingers 804 come into contact with the virtual object 900, two sense-of-force devices 20 fix each of the two fingers 804 not to move, thereby reproducing the reality of grasping the virtual object 900. Note that, in the related art, in such a state, the user 800 can move the virtual object 900 by moving an arm.

However, in such a related art, although the virtual object 900 is sandwiched by the fingers 804, the sense-of-force devices 20 only fix the fingers 804 and cannot give, to the user 800, a sense of force corresponding to the gravity acting on the virtual object 900. As a result, since the user 800 cannot recognize the gravity acting on the virtual object 900, it is difficult for the user 800 to feel the reality of grasping the virtual object 900.

Specifically, in the related art, when the sense-of-force device 20 is a non-grounded sense-of-force device, the sense-of-force device 20 cannot apply, as a sense of force, a drag that hinders movement of a hand and an arm of the user 800 to the entire hand and arm of the user 800. Therefore, in the related art, since the user 800 cannot recognize the gravity acting on the virtual object 900, it is difficult for the user 800 to feel the reality of grasping the virtual object 900.

Therefore, for example, it is conceivable to calculate inertial force and gravity acting on the virtual object 900 and give a sense of force based on calculated values to the finger 804. However, a lot of times and loads are required for the calculation processing for the inertial force and the gravity and there are restrictions on a range, a direction, and the like of a load amount of a sense of force that can be presented by the sense-of-force device 20. For that reason, in the related art, it is difficult to give, to the user 800, a sense of force for imparting the reality of the virtual object 900 in a timely manner without giving a sense of discomfort. Therefore, even when processing considering the inertial force and the gravity is performed, it is difficult for the user 800 to feel the reality of grasping the virtual object 900.

Accordingly, in view of such a situation, the present inventors have created the embodiment of the present disclosure that can improve reproducibility of the reality of the virtual object 900 even when a non-grounded sense-of-force device is used as the sense-of-force device 20.

In the embodiment of the present disclosure created by the present inventors, an effect of causing the user 800 to recognize weight is imparted to the virtual object 900. Specifically, in the present embodiment, as illustrated in the lower center of FIG. 7, when the virtual object 900 is grasped by the two fingers 804 on which the sense-of-force devices 20 are worn, a delay is added to the movement of the virtual object 900 due to the movement (user operation) of the finger 804 of the user 800 and sense of force presentation and display are performed based on the movement of the virtual object 900 to which the delay is added. Consequently, according to the embodiment of the present disclosure, since a sense of force or a visual sense of the virtual object 900 simulatively sinking into the finger 804 or the like of the user 800 is given, the user 800 can feel the gravity acting on the virtual object 900 in a timely manner. As a result, according to the present embodiment, it is possible to improve the reproducibility of the reality of the virtual object 900. In the following explanation, details of the embodiment of the present disclosure created by the present inventors are sequentially explained.

2. Embodiment

<2.1 Detailed Configuration of the Control Device 40>

Figure 8:
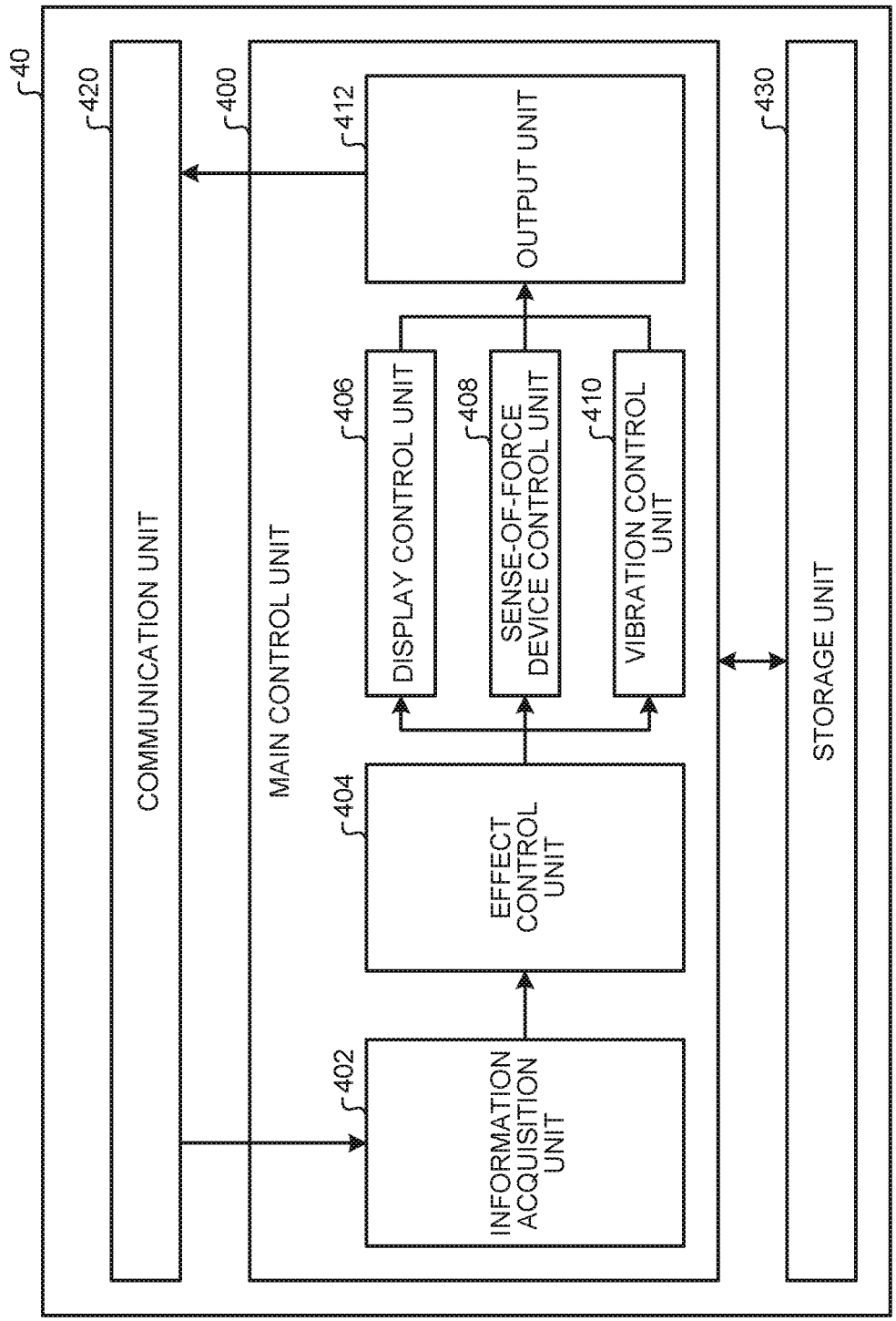
FIG. 8 is a diagram illustrating an example of a functional block configuration of a control device 40 according to the embodiment of the present disclosure.

First, a detailed configuration of the control device 40 according to the embodiment of the present disclosure is explained with reference to FIG. 8. FIG. 8 is a diagram illustrating an example of a functional block configuration of the control device 40 according to the present embodiment. As illustrated in FIG. 8, the control device 40 according to the present embodiment mainly includes, for example, a main control unit 400, a communication unit 420, and a storage unit 430. In the following explanation, functional blocks of the control device 40 according to the present embodiment are sequentially explained.

(Main Control Unit 400)

The main control unit 400 is provided in the control device 40 and can integrally control the control device 40. The main control unit 400 is realized by hardware such as a CPU, a ROM (Read Only Memory), and a RAM (Random Access Memory). Specifically, as illustrated in FIG. 8, the main control unit 400 functions as an information acquisition unit 402, an effect control unit 404, a display control unit 406, a sense-of-force device control unit 408, a vibration control unit 410, and an output unit 412. In the following explanation, details of these functional units of the main control unit 400 according to the present embodiment are explained.

The information acquisition unit 402 can acquire operation information concerning user operation performed on the virtual object 900 by the user 800. Specifically, the information acquisition unit 402 can acquire, with imaging data from the camera 30, information (operation position information) of the position (specifically, the relative position with respect to the virtual object 900) and posture of the finger 804 of the user 800 wearing the sense-of-force device 20 (an example of a part of the body of the user 800 that can virtually come into contact with the virtual object 900) and information (operation direction information) such as an operation direction from the finger 804 to the virtual object 900. Further, the information acquisition unit 402 may acquire, as information concerning a state of user operation, with the imaging data from the camera 30, information concerning a state of an arm (for example, whether the arm is stretched) of the user 800 wearing the sense-of-force device 20.

The information acquisition unit 402 can also acquire, from the storage unit 430 explained below, attribute information (a volume, a weight, a color, a shape, a surface state, and the like) added to the virtual object 900 and environment information (weather, a wind direction, and the like) concerning an environment of a virtual space displayed on the display device 10. Further, the information acquisition unit 402 can acquire environment information (an air pressure, a wind direction, and the like) concerning the environment of the real space from an air pressure sensor (not illustrated), a wind force sensor (not illustrated), and the like that measure a real environment around the user 800. Then, the information acquisition unit 402 can output the acquired various kinds of information to the effect control unit 404 explained below.

The effect control unit 404 can perform processing for imparting, based on the various kinds of information from the information acquisition unit 402, to the virtual object 900, an effect of causing the user 800 to recognize the weight of the virtual object 900. Specifically, the effect control unit 404 can add a delay to movement of the virtual object 900 based on user operation as an effect and can further determine an amount of the delay based on the various kinds of information from the information acquisition unit 402. For example, the effect control unit 404 can determine the delay amount based on attribute information (a volume, a weight, a color, a shape, a surface state, and the like) added to the virtual object 900, environment information concerning an environment of a real space or a virtual space, and a state of the user operation (for example, a degree of stretching of the arm of the user 800). In the present embodiment, the delay amount is determined using such various kinds of information, a time and a load required for processing for determining the delay amount are small and the delay amount can be quickly determined. Therefore, an effect can be presented to the user 800 in a timely manner. The effect control unit 404 can output the determined delay amount to the display control unit 406, the sense-of-force device control unit 408, and the vibration control unit 410 explained below. Note that a specific example of giving a delay is explained below.

In the present embodiment, the effect control unit 404 can determine, based on the specifications, a delay amount, and the like of the sense-of-force device 20, whether to execute any one, two, or all of display, sense of force presentation, and vibration presentation.

The display control unit 406 can control the display device 10 to display the virtual object 900 based on movement of the virtual object 900 to which a delay is given. Specifically, the display control unit 406 can generate control information for the display device 10 and output the control information to the output unit 412 explained below.

The sense-of-force device control unit 408 can control the sense-of-force device 20 worn on a part (for example, the finger 804) of the body of the user 800 to present a sense of force for causing the user 800 to recognize weight, for example, a sense of force based on the movement of the virtual object 900 to which the delay is given. Specifically, the sense-of-force device control unit 408 can generate control information for the sense-of-force device 20 and output the control information to the output unit 412 explained below.

The vibration control unit 410 can control a vibration device (not illustrated) loaded on the sense-of-force device 20 worn on a part (for example, the finger 804) of the body of the user 800 to present vibration based on the movement of the virtual object 900 to which the delay is given. Specifically, the vibration control unit 410 can generate control information for the vibration device and output the control information to the output unit 412 explained below.

The output unit 412 can synchronize the control information from the display control unit 406, the sense-of-force device control unit 408, and the vibration control unit 410 and output the control information to the display device 10, the sense-of-force device 20, and the vibration device (not illustrated). Note that, as explained above, in the present embodiment, any one or two of the display, the sense of force presentation, and the vibration presentation is sometimes executed. In such a case, the output unit 412 synchronizes the control information determined to be executed and outputs the control information to the device corresponding to the control information.

(Communication Unit 420)

The communication unit 420 can transmit and receive information to and from external devices such as the display device 10, the sense-of-force device 20, and the camera 30. In other words, the communication unit 420 can be considered a communication interface having a function of transmitting and receiving data and is implemented by, for example, a communication device such as a transmission and reception circuit or a port.

(Storage Unit 430)

The storage unit 430 stores programs, information, and the like for the main control unit 400 to execute various kinds of processing and information obtained by the processing. For example, the storage unit 430 stores attribute information (a volume, a weight, a color, a shape, a surface state, and the like) added to the virtual object 900. Further, the storage unit 430 stores, for example, a table and a formula for calculating a delay amount from the attribute information and the like. The storage unit 430 is implemented by, for example, a storage device such as an HDD (Hard Disk Drive).

Note that, in the embodiment of the present disclosure, a configuration of the control device 40 is not limited to the configuration illustrated in FIG. 8 and may include other functional units.

<2.2 Giving a Specific Delay>

Figure 10:
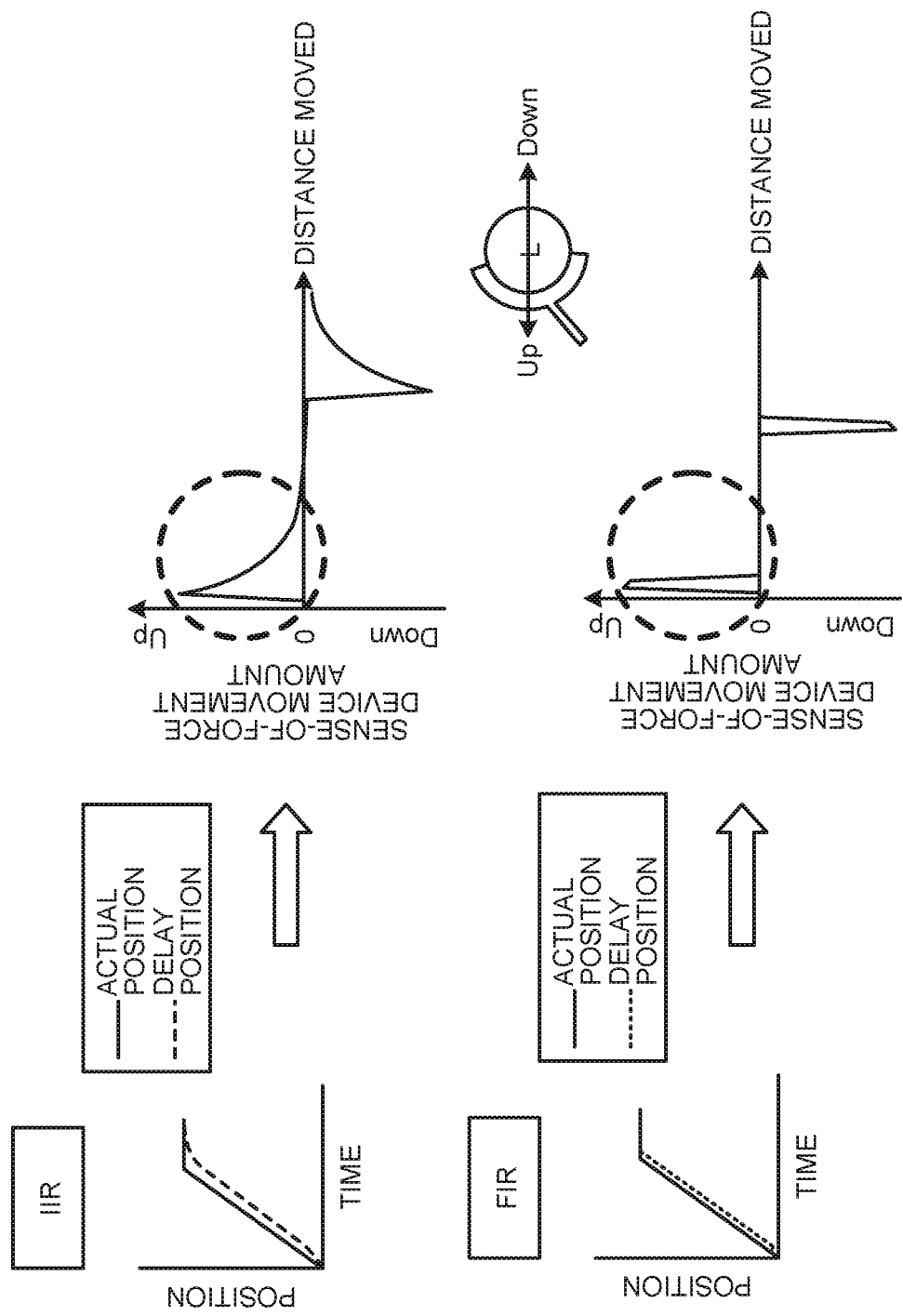
FIG. 10 is an explanatory diagram (No. 2) for explaining imparting of a delay according to the embodiment of the present disclosure.

Next, a specific example of giving a delay to the virtual object 900 according to the present embodiment is explained with reference to FIG. 9 and FIG. 10. FIG. 9 and FIG. 10 are explanatory diagrams for explaining giving of a delay according to the present embodiment.

First, a specific example of giving a delay to the virtual object 900 according to the present embodiment is explained with reference to FIG. 9. The example illustrated in FIG. 9 is similar to the example illustrated in FIG. 7 and is a case in which the virtual object 900 is grasped by the two fingers 804 (specifically, here, the two fingers 804 are a right hand finger and a left hand finger) on which the sense-of-force devices 20 are worn. Specifically, the example illustrated in FIG. 9 illustrates a case in which the user 800 moves the left hand finger 804 in the right direction and, while moving the virtual object 900 to the right side, presses the virtual object 900 against the right hand finger 804 to sandwich the virtual object 900

In the present embodiment, a delay is added to the movement (the movement in the right direction in the figure) of the virtual object 900 due to the movement of the left hand finger 804 of the user 800 and sense of force presentation and display are performed based on the movement of the virtual object 900 to which the delay is added. By adding the delay, a sense of force and a visual sense of the virtual object 900 simulatively sinking into the finger 804 of the user 800 is given. Therefore, the user 800 can feel the gravity acting on the virtual object 900.

Specifically, in the present embodiment, when the two fingers 804 illustrated in the upper center of FIG. 9 come into contact with the virtual object 900, a sense of force (a load) illustrated on the lower left side of FIG. 9 is given to the left hand finger 804 and a sense of force (a load) illustrated on the lower right side of FIG. 9 is given to the right hand finger 804.

First, the sense of force given to the left hand finger 804 is explained. At the start of the movement of the virtual object 900 (in a range surrounded by a circle on the left side), a load (a first load) having a direction (an Up direction in the figure) opposite to the direction of the movement (user operation) of the left hand finger 804 is applied to the left hand finger 804 by the sense-of-force device 20 such that the movement of the virtual object 900 is delayed and the virtual object 900 sinks into the left hand finger 804. Next, as the virtual object 900 moves in the right direction according to the movement of the left hand finger 804, the load applied to the left hand finger 804 first decreases. When the virtual object 900 is stopped (in a range surrounded by a circle on the right side), a load (a second load) having the same direction (a Down direction in the figure) as the direction of the movement (user operation) of the left hand finger 804 is applied to the left hand finger 804 by the sense-of-force device 20 to eliminate the delay of the virtual object 900 (to return to the original state). In the present embodiment, it is preferable that a load amount (the height and the area of a peak to the Up side in the figure) applied first and a load amount (the height and the area of a peak to the Down side in the figure) applied next are the same, that is, balanced.

Similarly, the sense of force given to the right hand finger 804 is explained. At the start of the movement of the virtual object 900, a load having a direction (the Down direction in the figure) opposite to the direction of the movement of the virtual object 900 is applied to the right hand finger 804 by the sense-of-force device 20. Next, the virtual object 900 moves in the right direction according to the movement of the left hand finger 804 and the load initially applied to the right hand finger 804 decreases. When the virtual object 900 is stopped, a load having the same direction (the Up direction in the figure) as the direction of the movement of the virtual object 900 is applied to the right hand finger 804 by the sense-of-force device 20 to eliminate the delay of the virtual object 900 (to return to the original state). In the present embodiment, it is preferable that a load amount (the height and the area of a peak to the Down side in the figure) applied first and a load amount (the height and the area of a peak to the Up side in the figure) applied next are the same, that is, balanced. Note that, depending on how the finger 804 is moved, the delayed display of the virtual object 900 and the finger 804 are sometimes separated. In such a case, in the present embodiment, an image (drawing) of the virtual object 900 may be changed such that the finger 804 and the display of the virtual object 900 virtually come into contact with each other.

As explained above, in the present embodiment, a delay is added to the movement of the virtual object 900 due to the movement of the left hand finger 804 of the user 800 and sense of force presentation is performed based on the movement of the virtual object 900 to which the delay is added. According to the present embodiment, by adding the delay in this manner, a sense of force of the virtual object 900 simulatively sinking into the finger 804 of the user 800 is given. Therefore, the user 800 can feel the gravity acting on the virtual object 900. As a result, according to the present embodiment, it is possible to improve the reproducibility of the reality of the virtual object 900.

Further, in the present embodiment, it is preferable to smoothly present a sense of force in order to avoid giving a sense of discomfort to the user 800. Therefore, in the present embodiment, it is preferable to use, as the position of the delayed virtual object 900, a position obtained by applying filter processing (smoothing processing) to the movement (a change with time of the position) of the virtual object 900 due to the movement of the finger 804 of the user 800.

Specifically, the upper part of FIG. 10 illustrates a delay position and sense of force presentation concerning the left hand finger 804 in the case in which an IIR (infinite Impulse Response filter is used. Since the IIR filter has an impulse response function for returning a non-zero value in an infinite-length time, all of information in the past is fed back and output information is determined. Therefore, as illustrated in the upper left side of FIG. 10, a smooth change with time (a broken line) of a delay position can be obtained. In the present embodiment, a change with time of a load amount (a load amount given first) given as a sense of force illustrated on the upper right side of FIG. 10 is determined (a region surrounded by a circle on the upper right side of FIG. 10) based on a change with time of the difference between the movement (an actual position) (a solid line) of the virtual object 900 due to the movement of the finger 804 of the user 800 and a delay position (a broken line) obtained by the filter processing illustrated on the upper left side of FIG. 10.

A lower part of FIG. 10 illustrates a delay position and sense of force presentation concerning the left hand finger 804 in the case in which an FIR filter (Finite Impulse Response Filter) is used. The FIR filter has a finite time impulse response function and can obtain a change with time (a broken line) of a delay position illustrated in the lower left side of FIG. 10. In the present embodiment, a change with time of a load amount (a load amount given first) given as a sense of force illustrated on the lower right side of FIG. 10 is determined based on a change with of the difference between the movement (an actual position) (a solid line) of the virtual object 900 due to the movement of the finger 804 of the user 800 and a delay position (a broken line) obtained by the filter processing illustrated on the lower left side of FIG. 10 (region surrounded by a circle on the lower right side of FIG. 10).

As explained above, since a sense of force changes depending on a filter in use, in the present embodiment, it is preferable to select the filter in use as appropriate based on a use, a situation, and the like in which the presentation system 1 is used. Note that, in the present embodiment, the filter in use is not limited to the IIR filter or the FIR filter and may be another filter.

In the present embodiment, a delay amount may be changed according to moving speed of the virtual object 900. At this time, the delay amount can be changed by changing a coefficient of the filter.

As explained above, in the present embodiment, the position obtained by applying the filter processing (the smoothing processing) to the movement (the change with time of the position) of the virtual object 900 due to the movement of the finger 804 of the user 800 is used as the position of the delayed virtual object 900. Consequently, according to the present embodiment, since a sense of force can be smoothly presented, it is possible to avoid giving a sense of discomfort to the user 800, that is, to present the sense of force closer to the human sense.

<2.3 Delay Amount>

Next, an example of a specific method of determining a delay amount given to the virtual object 900 according to the present embodiment is explained with reference to FIG. 11 to FIG. 17. FIG. 11 to FIG. 17 are explanatory diagrams for explaining a method of determining a delay amount according to the present embodiment. In the present embodiment, it is possible to further improve the reproducibility of the reality of the virtual object 900 by determining a delay amount based on various parameters.

Figure 11:
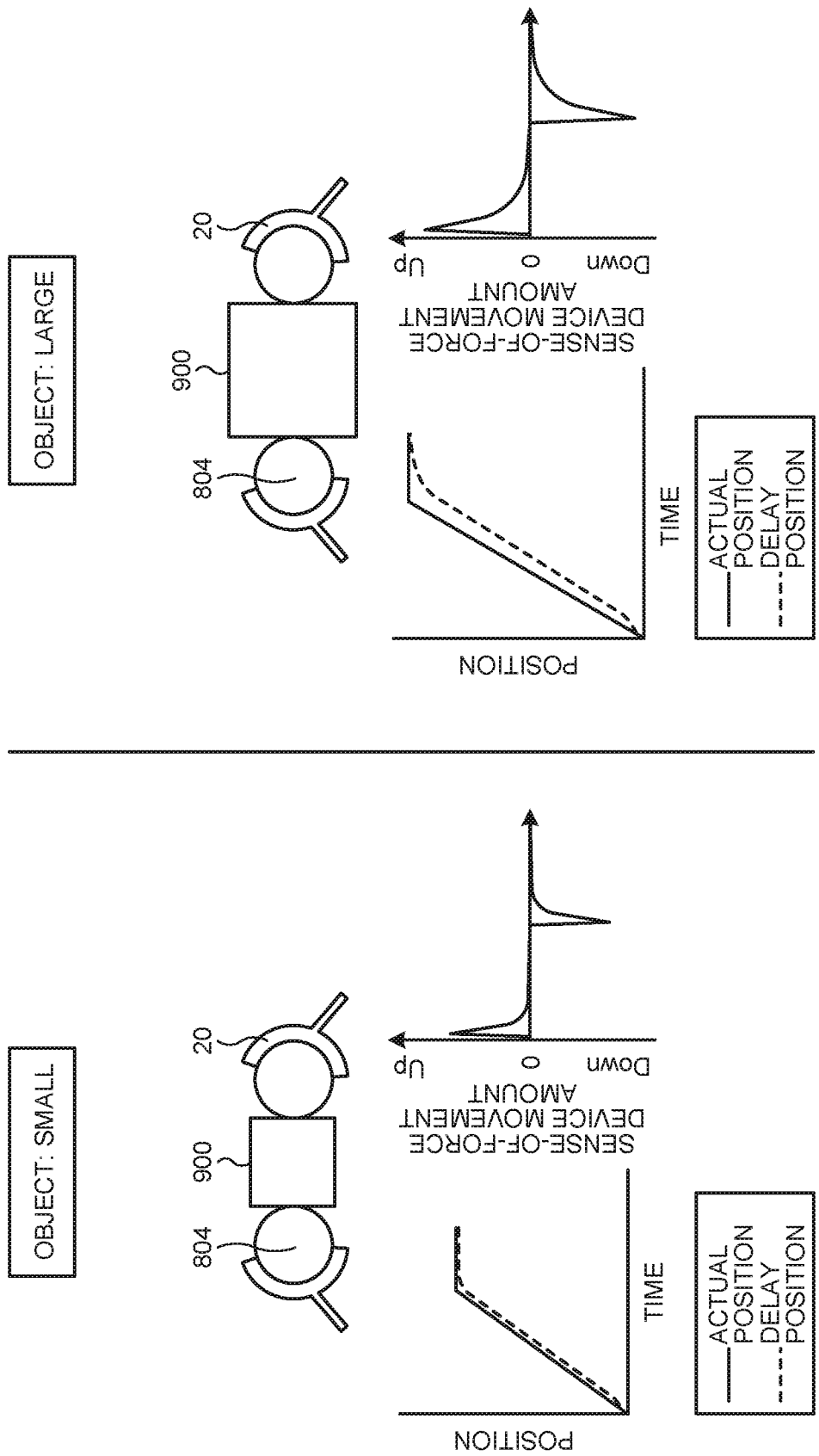
FIG. 11 is an explanatory diagram (No. 1) for explaining a method of determining a delay amount according to the embodiment of the present disclosure.

First, in the present embodiment, as illustrated in FIG. 11, a delay length may be determined based on the size, that is, a volume value (volume information) of the virtual object 900. For example, assuming that weight is larger as the apparent size of the virtual object 900 is larger, a delay amount is determined based on a volume value added in advance to the virtual object 900 as attribute information.

Specifically, as illustrated on the left side of FIG. 11, when the volume value of the virtual object 900 is small, the delay amount is reduced and, accordingly, a load amount presented as a sense of force is also reduced. Consequently, the user 800 can feel that the virtual object 900 is light. On the other hand, as illustrated on the right side of FIG. 11, when the volume value of the virtual object 900 is large, the delay amount is increased and, accordingly, the load amount presented as the sense of force is also increased. Consequently, the user 800 can feel that the virtual object 900 is heavy. That is, in the present embodiment, it is possible to further improve the reproducibility of the reality of the virtual object 900 by determining the delay amount based on the volume value of the virtual object 900. Note that, in the present embodiment, the volume value explained above is stored in advance in the storage unit 430 in association with, for example, data of the virtual object 900, identification information of the virtual object 900, and the like. Further, in the present embodiment, a table and a formula (an algorithm) for calculating a delay amount from a volume value are also stored in the storage unit 430.

Note that, in the present embodiment, the delay amount may be determined based on not only the volume value of the virtual object 900 but also, for example, an aspect ratio of the height and the width, a specific shape, or the like of the virtual object 900. In the present embodiment, the delay amount may be determined based on the weight (weight information) of the virtual object 900 added in advance. Further, in the present embodiment, the delay amount may be determined based on both the weight and the volume value. Note that, in the present embodiment, it is assumed that the aspect ratio, the shape, and the weight are stored in advance in the storage unit 430 like the volume value in association with, for example, the data of the virtual object 900, the identification information of the virtual object 900, and the like.

Figure 12:
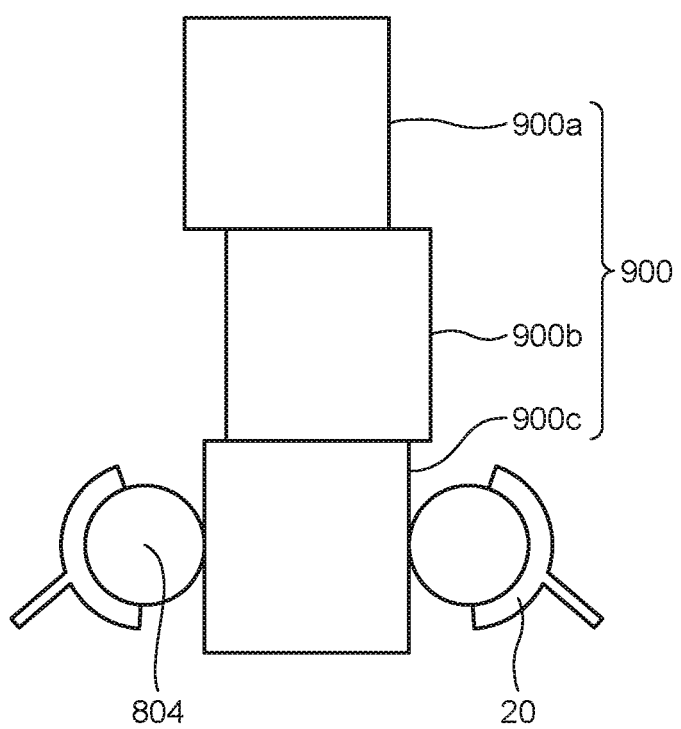
FIG. 12 is an explanatory diagram (No. 2) for explaining the method of determining a delay amount according to the embodiment of the present disclosure.

In the present embodiment, for example, as illustrated in FIG. 12, when virtual objects 900*a*, 900*b*, and 900*c* are stacked and the user 800 grasps the virtual object 900*c* located at the bottom among a plurality of stacked virtual objects 900*a*, 900*b*, and 900*c*, a delay amount may be determined by the sum of the weights of the plurality of virtual objects 900*a*, 900*b*, and 900*c*.

Figure 13:
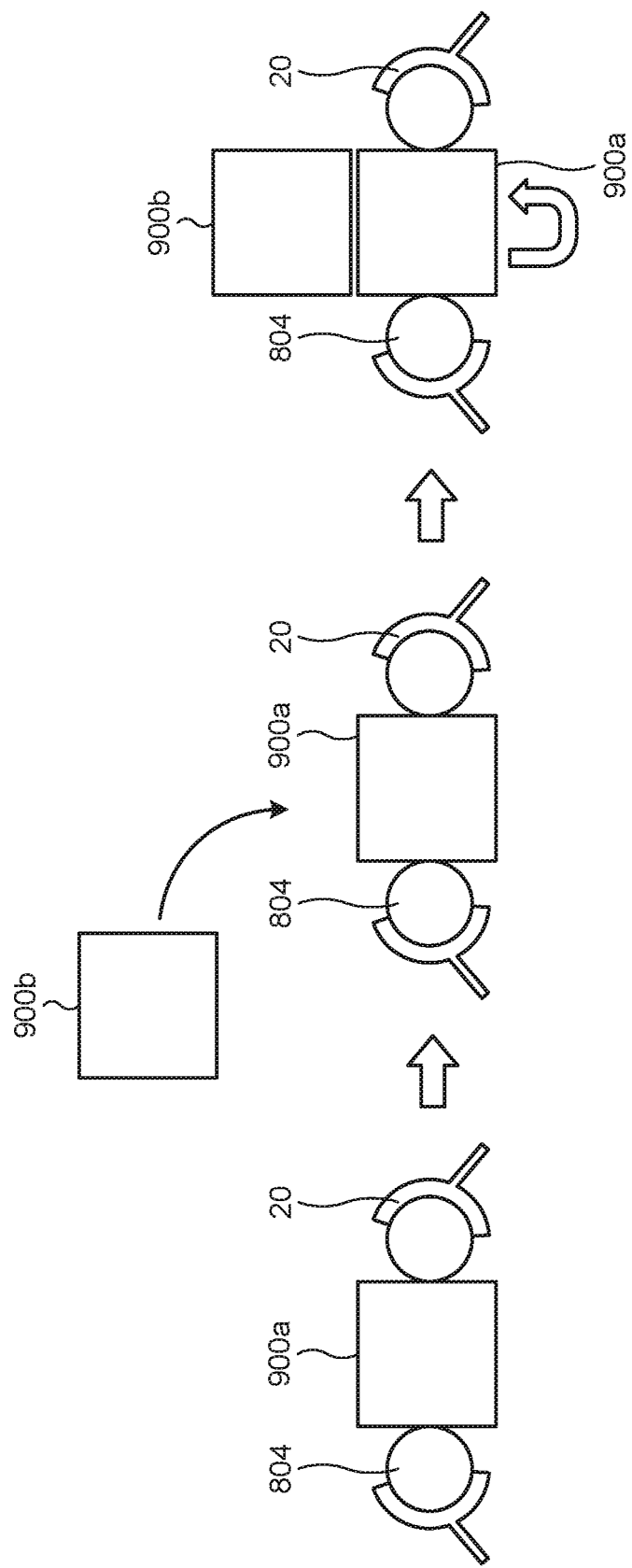
FIG. 13 is an explanatory diagram (No. 3) for explaining the method of determining a delay amount according to the embodiment of the present disclosure.

In the present embodiment, as illustrated in FIG. 13, at an instance when the virtual object 900 is stacked, an effect involved in the stacking may be given to the virtual object 900. For example, as illustrated on the left side of FIG. 13, in a state in which the user 800 is grasping one virtual object 900*a*, as illustrated in the center of FIG. 13, at an instance when another virtual object 900*b* is stacked on the grasped virtual object 900*a*, vibration may be applied to the user 800 by a vibration device (not illustrated) loaded on the sense-of-force device 20. At this time, for example, when the stacked virtual object 900*b* is elongated in the up-down direction, vibration with small amplitude may be applied at a high frequency or, when the weight of the virtual object 900*b* is large, vibration with large amplitude may be applied at a low frequency.

Further, in the present embodiment, as illustrated on the right side of FIG. 13, at an instance when another virtual object 900*b* is stacked on the virtual object 900*a*, the positions of the virtual objects 900*a* and 900*b* may be instantaneously moved downward by the weight of the another virtual object 900*b* and returned to the original positions after sinking a little. Based on the movements of the virtual objects 900*a* and 900*b*, a sense of force may be given to the user 800 or the virtual object 900 may be displayed.

In the present embodiment, a delay amount may be determined based on a color added to the virtual object 900. For example, when the virtual object 900 is black, it is considered that the virtual object is likely to be felt heavy because of a color. Therefore, the delay amount may be set to be large such that the virtual object 900 can be felt heavy. On the other hand, when the virtual object 900 is white, it is considered that the virtual object 900 is felt light because of a color. Therefore, the delay amount may be set small such that the virtual object 900 can be felt light.

As explained above, in the present embodiment, since the delay amount is determined using the attribute information such as the volume value and the weight, a time and a load required for processing for determining the delay amount are small and the delay amount can be quickly determined.

In the present embodiment, the delay amount may be determined according to a state of operation on the virtual object 900 by the user 800. For example, as illustrated in FIG. 14, the delay amount may be determined based on a state of an arm 806 corresponding to a hand holding the virtual object 900. Specifically, as illustrated on the left side of FIG. 14, when the user 800 is stretching the arm 806 and holding the virtual object 900, the delay amount may be set large such that the virtual object 900 can be felt heavy. On the other hand, as illustrated on the right side of FIG. 14, when the user 800 is bending the arm 806 and holding the virtual object 900, the delay amount may be set to be small such that the virtual object 900 can be felt light. Note that, in the present embodiment, it is assumed that the state of the arm 806 of the user 800 can be detected based on video data of the camera 30.

As explained above, in the present embodiment, since the delay amount can be determined according to the state of the arm 806, the time and the load required for the processing for determining the delay amount are small and the delay amount can be quickly determined. In the present embodiment, the delay amount may be determined according to not only the state of the arm 806 but also types and the number of fingers used to hold the virtual object 900 or the delay amount may be determined according to a way of holding or a type of an action (grasping, pushing, or the like). Further, in the present embodiment, the delay amount may be changed based on a moving direction, a movement amount, a load amount, and the like allowed for the sense-of-force device 20. In the present embodiment, the user 800 may be guided using a visual sense, a sense of force, or the like to hold the virtual object 900 according to the moving direction, the movement amount, the load amount, or the like allowed for the sense-of-force device 20.

Figure 15:
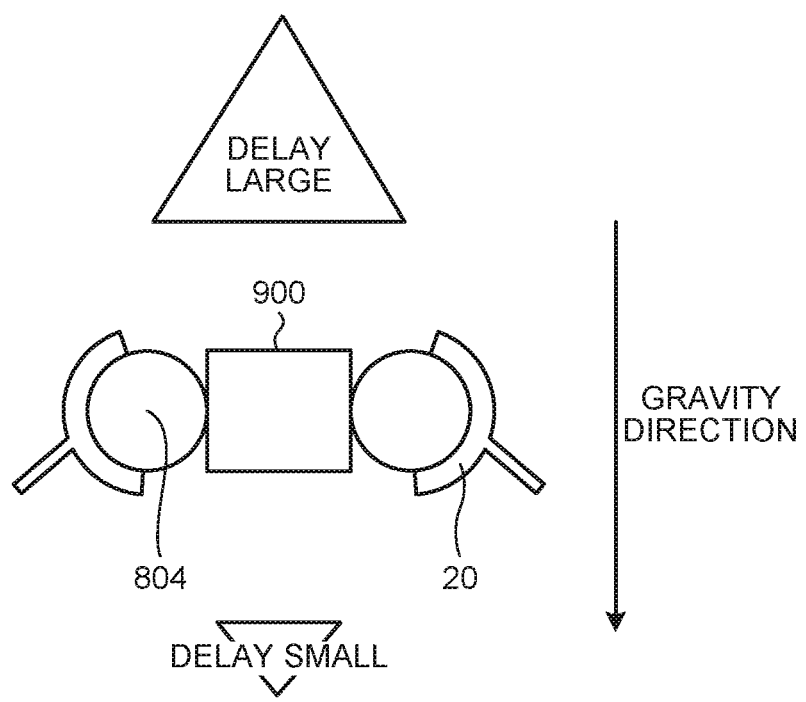
FIG. 15 is an explanatory diagram (No. 5) for explaining the method of determining a delay amount according to the embodiment of the present disclosure.

In the present embodiment, the delay amount may be determined based on a resistance force (environment information concerning an environment of a real space or a virtual space) such as gravity, wind pressure, or water pressure in the real space or the virtual space and a direction of user operation applied to the virtual object 900 with respect to the resistance force. For example, as illustrated in FIG. 15, the delay amount may be determined according to a gravity direction in the real space or the virtual space. Specifically, when the virtual object 900 is to be moved in a direction opposite to a weight direction, the delay amount may be set large such that the virtual object 900 can be felt heavy. On the other hand, when the virtual object 900 is to be moved in the same direction with respect to the weight direction, the delay amount may be set small such that the virtual object 900 can be felt light. In the present embodiment, the delay amount may be determined based on not only gravity but also a flowing direction of wind, water, or the like and a resistance force in the real space or the virtual space. Note that, in the present embodiment, the resistance force such as gravity, wind pressure, and water pressure in the real space can be detected from sensing data of the gyro sensor (not illustrated), the atmospheric pressure sensor (not illustrated), the wind force sensor (not illustrated), and the like explained above.

Further, in the present embodiment, the delay amount may be determined based on a type, characteristics, and the like of an object added to the virtual object 900 as attribute information. For example, when the virtual object 900 is set as a "screw" and the screw is turned and inserted into a screw hole (the screw is tightened), a resistance force given as a sense of force may be increased by increasing the delay amount. On the other hand, when the "screw" is turned and removed from the screw hole (the screw is loosened), the resistance force given as the sense of force may be reduced by reducing the delay amount. Further, in the present embodiment, the delay amount may be determined according to hardness set for the virtual object 900 functioning as the screw and the resistance force given as the sense of force may be adjusted.

As illustrated in FIG. 16, when the virtual object 900 is rotated, in the present embodiment, a rotational moment can be presented to the user 800 by giving a sense of force having a vector F in a direction opposite to the tangent of the rotation. Further, in the present embodiment, for example, a force given as a sense of force is determined based on a delay amount based on weight virtually applied to the virtual object 900, a resistance force against rotation, and the like.

When it is difficult to give the sense of force having the vector F in the direction opposite to the tangent of the rotation, a sense of force having a vector having a direction close to the vector F among directions in which the sense of force can be given by the sense-of-force device 20 may be given as illustrated in the upper side of FIG. 16. Alternatively, a sense of force having a decomposed vector F' obtained by decomposing the vector F in a direction in which the sense of force can be given by the sense-of-force device 20 may be given. In the present embodiment, when it is difficult to give the sense of force explained above, a modal replacing the sense of force may be presented to the user 800.

As illustrated on the left side of FIG. 17, for example, when it is desired to move the virtual object 900 upward, even when it is desired to give a sense of force in the downward direction by the sense-of-force device 20, the sense of force in the downward direction sometimes cannot be given by the sense-of-force device 20. In such a case, in the present embodiment, for example, a sense of force that makes the user 800 virtually feel that it is difficult to hold the virtual object 900 may be given. For example, as illustrated on the right side of FIG. 17, a sense of force of the right hand finger 804 and the left hand finger 804 being felt separated wider may be given. By giving such a sense of force, the right hand finger 804 and the left hand finger 804 are separated wider. Therefore, since the user 800 obtains feeling as if the virtual object 900 slips down, the user 800 feels that it is difficult to hold the virtual object 900 and, as a result, feels the weight of the virtual object 900. Note that, at this time, it is preferable to also give a delay to display of the virtual object 900. Further, in the present embodiment, for example, the force given as the sense of force is determined based on the delay amount based on the weight or the like virtually applied to the virtual object 900.

When the presentation system 1 according to the present embodiment is used in a game or the like, the delay amount may be determined based on a parameter indicating a virtual value or the like added to the virtual object 900 as attribute information. For example, when the virtual object 900 is a character (For example, a monster) used in a game, the delay amount may be set based on a parameter of strength in a battle of the character. In this case, since the user 800 feels the weight of the character when grasping the character, the user 800 can intuitively feel, for example, the difficulty in throwing and the like. For example, when the virtual object 900 is an item used in the game (for example, a treasure box or a weapon), the delay amount may be set large for an item considered to have a high value in the game to make the user 800 feel the virtual object 900 heavy. Further, the delay amount may be increased or reduced as the virtual object 900 is closer to a predetermined target. An amusement property can be enhanced by adjusting the delay amount according to setting in the game. Note that, in the present embodiment, the various parameters explained above are stored in advance in the storage unit 430 in association with, for example, data of the virtual object 900, identification information of the virtual object 900, and the like.

When the presentation system 1 according to the present embodiment is used for learning sports, musical instrument play, or the like, the delay amount may be changed according to a proficiency level of the user 800.

Note that, in the present embodiment, an upper limit of the load amount allowed to be applied by the sense-of-force device 20 may be provided in advance based on the specifications of the sense-of-force device 20 and attributes (age, sex, and the like) of the user 800. For example, when the user 800 is a woman or a child, applying a large load amount causes a burden on the body of the user 800. Therefore, it is preferable to provide the upper limit of the load amount allowed to be applied by the sense-of-force device 20. In the present embodiment, when a load corresponding to a determined delay amount exceeds the specifications of the sense-of-force device 20, the sense-of-force device 20 may be substituted with a device that applies another modal as explained below.

In the present embodiment, the upper limit of the load amount allowed to be applied by the sense-of-force device 20 may be provided based on prior calibration or the like set in advance by the user 800.

<2.4 Display>

Next, an example of display of the virtual object 900 according to the present embodiment is explained with reference to FIG. 18. FIG. 18 is a diagram illustrating an example of display of the virtual object 900 according to the present embodiment. In the present embodiment, as explained above, a delay is given to display of the virtual object 900 as well in the same manner as to the sense of force (see FIG. 9). In the present embodiment, by giving the delay to the display of the virtual object 900 as well, it is possible to make the user 800 feel the weight of the virtual object 900 through a visual effect and it is possible to further improve the reproducibility the reality of the virtual object 900.

Note that, in the present embodiment, when the sense-of-force device 20 cannot be used, a delay may be given to only the display of the virtual object 900 or vibration by a vibration device (not illustrated) may be given to the user 800 simultaneously with giving the delay to the display of the virtual object 900. Alternatively, in the present embodiment, a delay may be given to only the sense of force and a delay may not be given to the display of the virtual object 900.

In the present embodiment, a delay is not limited to be given to the virtual object 900 when being translated according to operation of the user 800 but may be given to another movement such as rotation. Specifically, as illustrated in FIG. 18, for example, when an upper part of the elongated virtual object 900 is grasped by the right hand finger 804 and the left hand finger 804, the virtual object 900 may be rotated with a midpoint 902 between the left hand finger 804 and the right hand finger 804 as a rotation center after a delay is given to the translation of the virtual object 900 conforming to the movement of the left hand finger 804. In the rotation, the sense-of-force device 20 may present a pushing-up sense of force to the left hand finger 804.

<2.5 Other Modals>

Figure 19:
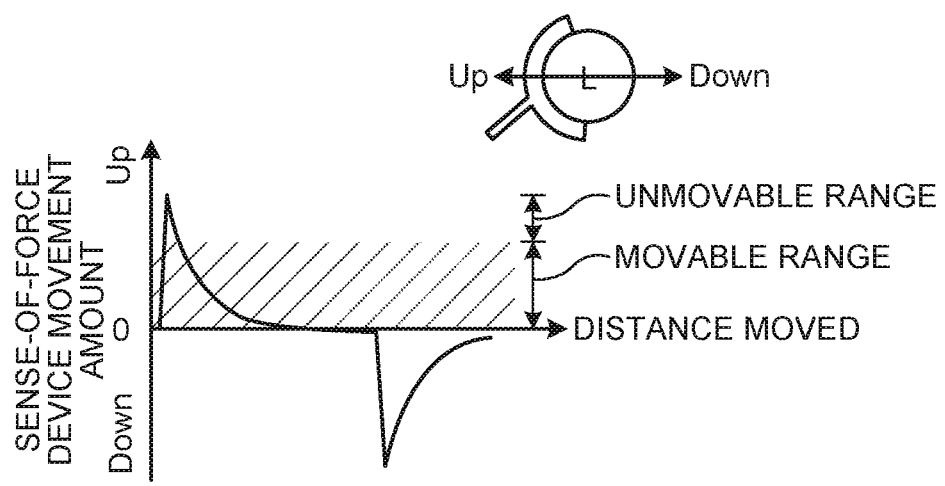
FIG. 19 is an explanatory diagram (No. 1) for explaining an example of presentation on another modal according to the embodiment of the present disclosure.
Figure 20:
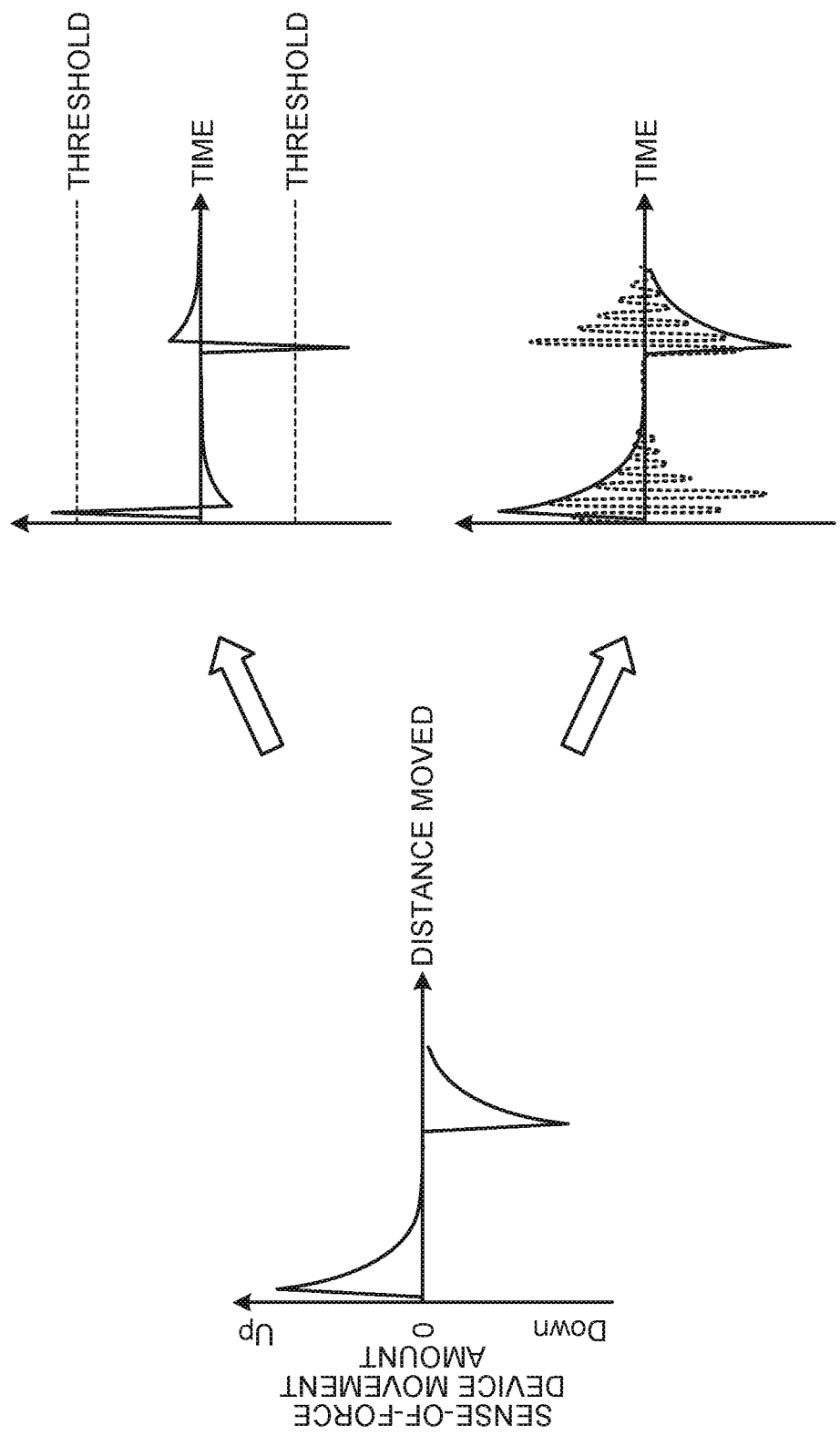
FIG. 20 is an explanatory diagram (No. 2) for explaining an example of presentation on another modal according to the embodiment of the present disclosure.
Figure 21:
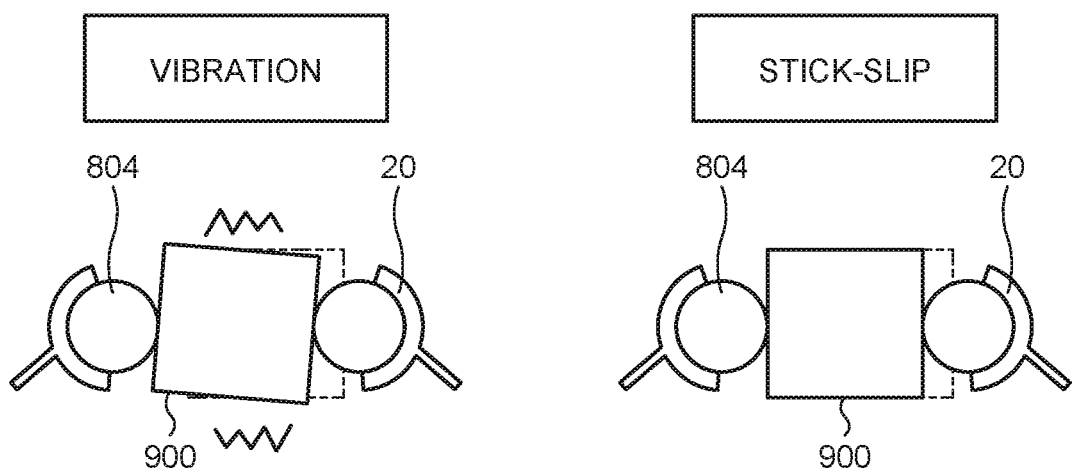
FIG. 21 is an explanatory diagram (No. 3) for explaining an example of presentation on another modal according to the embodiment of the present disclosure.

Next, an example of presentation by other modals in the present embodiment is explained with reference to FIG. 19 to FIG. 23. FIG. 19 to FIG. 23 are explanatory diagrams for explaining an example of presentation in the other modals according to the embodiment of the present disclosure. In the present embodiment, the delay amount is determined by the method explained above and the load amount of the sense of force given by the sense-of-force device 20 is determined based on the determined delay amount. However, there is a case in which the load amount that can be applied by the sense-of-force device 20 is limited. Therefore, in such a case, in the present embodiment, a modal replacing the sense of force may be presented to the user 800 using a device that gives another modal Specifically, as illustrated in FIG. 19, when the load amount of the sense of force given by the sense-of-force device 20 is determined based on the delay amount, the load amount sometimes exceeds a range in which the sense-of-force device 20 can move. In the present embodiment, in such a case, the load amount may be reduced by an amount exceeding the range in which the sense-of-force device 20 can move and presented as the sense of force or the load amount exceeding the range may be substituted by being given by another modal. In the present embodiment, examples of the other modals include vibration, electrical stimulation, and air pressure. Alternatively, as another modal, only display (vision) of the virtual object 900 may be vibrated and displayed. Note that, in the present embodiment, when the load amount is reduced as explained above, that is, when a load amount on an Up side illustrated in FIG. 19 is reduced, it is preferable to adjust a load amount on a Down side to be equal to the reduced load amount on the Up side.

In the following explanation, giving vibration as another modal instead of the sense of force is focused and explained. In such a case, the vibration is determined based on the load amount given as the sense of force. In the present embodiment, for example, an alternative to the presentation of the sense of force illustrated on the left side of FIG. 20 can be vibration that is temporarily given at an instance when a value obtained by differentiating the load amount of the sense of force exceeds a threshold as illustrated in the upper right part of FIG. 20. In the present embodiment, for example, as illustrated in the lower right part of FIG. 20, vibration such as a sine wave having, as an envelope, a change with time in the load amount given as the sense of force may be presented. Further, in the present embodiment, such presentation of the vibration may be not only performed as an alternative to the presentation of the sense of force but also performed together with the presentation of the sense of force.

In the present embodiment, when it is desired to more effectively present vibration, an effect may be added to the vibration. For example, examples of the effect given to the vibration include random vibration illustrated on the left side of FIG. 21 and stick-slip for giving an effect being hooked illustrated on the right side of FIG. 21. Details of such an effect are explained below.

Figure 22:
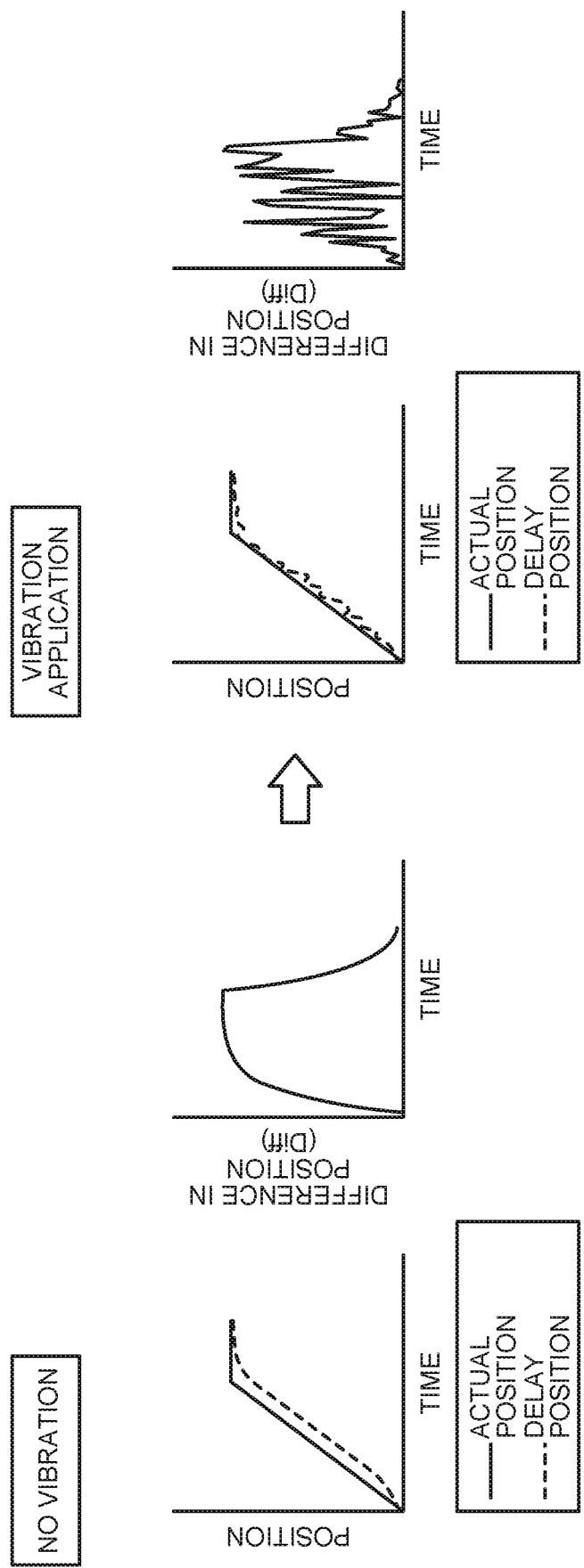
FIG. 22 is an explanatory diagram (No. 4) for explaining an example of presentation on another modal according to the embodiment of the present disclosure.

First, a method of applying random vibration is explained with reference to FIG. 22. The left side of FIG. 22 illustrates changes with time of a position and a delay position of the virtual object 900 before vibration is applied and the difference between in the position and the delay position of the virtual object 900. In such a case, the delay position of the virtual object 900 to which random vibration is added can be determined using the following Formula (1). In Formula (1), a delay position Pnew of the virtual object 900 to which the random vibration is added can be indicated by any coefficient α satisfying 0≤α≤1, a position P of the virtual object 900 before the vibration is applied, a delay position P', and any noise RAND ( ) such as white noise. Note that, in the present embodiment, it is preferable that the delay position Pnew of the virtual object 900 does not exceed the position P of the virtual object 900 before the vibration is applied.

$$P_{new} = \alpha \times |P - P'| \times \text{RAND}(\ ) + P' \qquad (1)$$

In the present embodiment, it is possible to cause the user 800 to more effectively feel the weight of the virtual object 900 by applying random vibration based on such Formula (1) to the virtual object 900 and delaying the virtual object 900. In the present embodiment, the frequency (the period) of vibration may be changed according to distribution of unevenness of the surface of the virtual object 900 if the surface of the virtual object 900 is set to be subjected to, for example, embossing. Further, in the present embodiment, the frequency (the period), the amplitude, and the like of vibration may be changed according to a type of the finger 804 holding the virtual object 900. When the presentation system 1 according to the present embodiment is used for learning sports, musical instrument play, or the like, the frequency (the period), the amplitude, or the like of vibration may be changed according to a proficiency level of the user 800.

Figure 23:
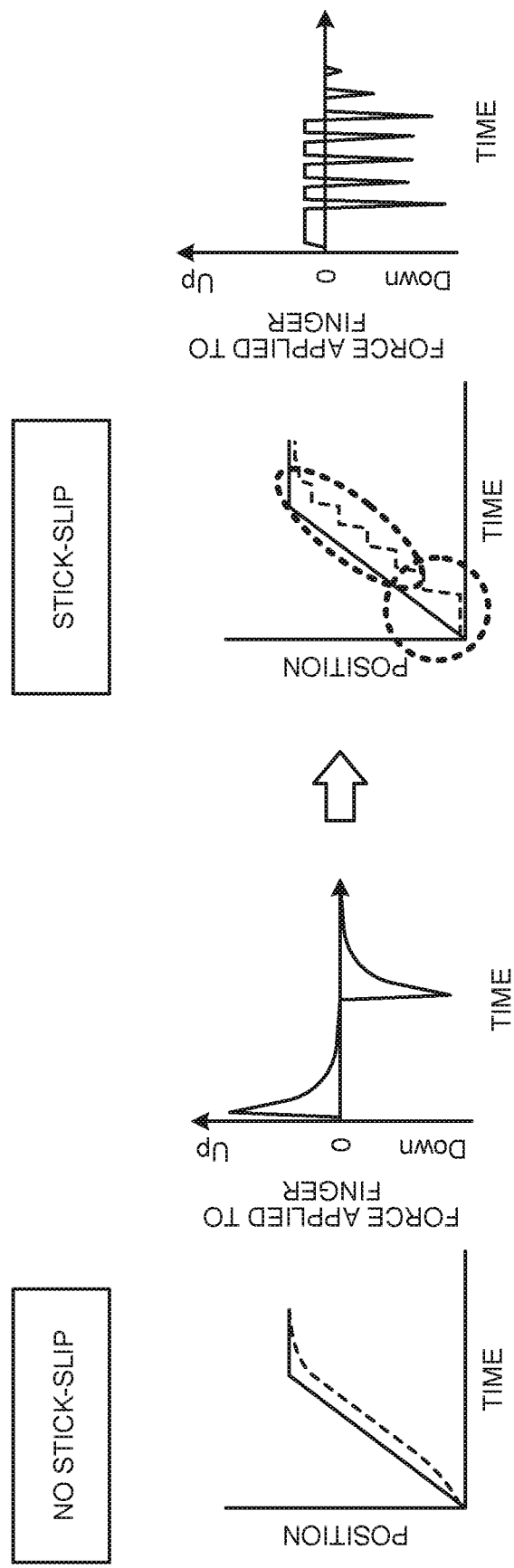
FIG. 23 is an explanatory diagram (No. 5) for explaining an example of presentation on another modal according to the embodiment of the present disclosure.

Next, the stick-slip is explained with reference to FIG. 23. On the left side of FIG. 23, changes with time of the position and the delay position of the virtual object 900 before application of the stick-slip and a change with time of a load amount of a sense of force are illustrated. In such a case, by applying the stick-slip, the change with time of the delay position of the virtual object 900 and the change with time of the load amount of the sense of force change as illustrated on the right side of FIG. 23. Specifically, in the present embodiment, a large hook is applied (a region surrounded by a circle indicated by a broken line) at the start of movement and a small hook is applied (a region surrounded by an ellipse indicated by a broken line) at a standstill time. In the present embodiment, even in the case of the stick-slip, it is preferable that a product of force applied to the finger 804 is balanced between the Down direction and the Up direction (in the graph illustrated on the right side of FIG. 23, the sum of the areas of peaks in the Up direction and the sum of the areas of peaks in the Down direction are the same.).

<2.6 Other Operation>

Figure 24:
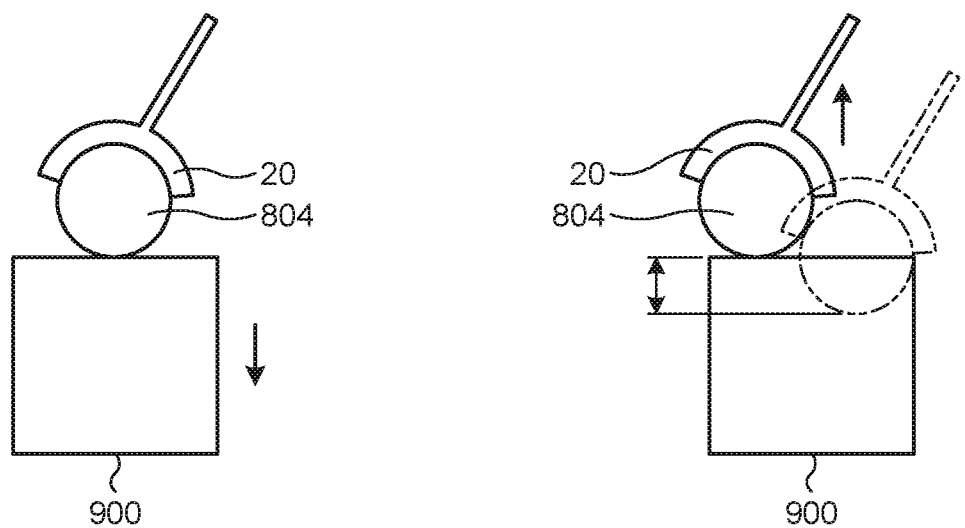
FIG. 24 is an explanatory diagram illustrating an example of other operation according to the embodiment of the present disclosure.

Next, another operation example in the present embodiment is explained with reference to FIG. 24. FIG. 24 is an explanatory diagram illustrating an example of another operation according to the present embodiment. In the present embodiment, not only operation for holding the virtual object 900 but also an operation for pushing the virtual object 900 can be applied.

In the present embodiment, for example, in setting in which the virtual object 900 moves, as illustrated on the left side of FIG. 24, when the finger 804 comes into contact with and pushes in the virtual object 900, a sense of force may be applied according to temporarily delayed movement of the virtual object 900 and thereafter the sense of force may be released to move the virtual object 900.

In the present embodiment, for example, in setting in which the virtual object 900 does not move, as illustrated on the right side of FIG. 24, when the finger 804 comes into contact with and pushes in the virtual object 900, a sense of force of the virtual object 900 sinking into the finger 804 and lifting the finger 804 may be given.

<2.7 Control Method>

Figure 25:
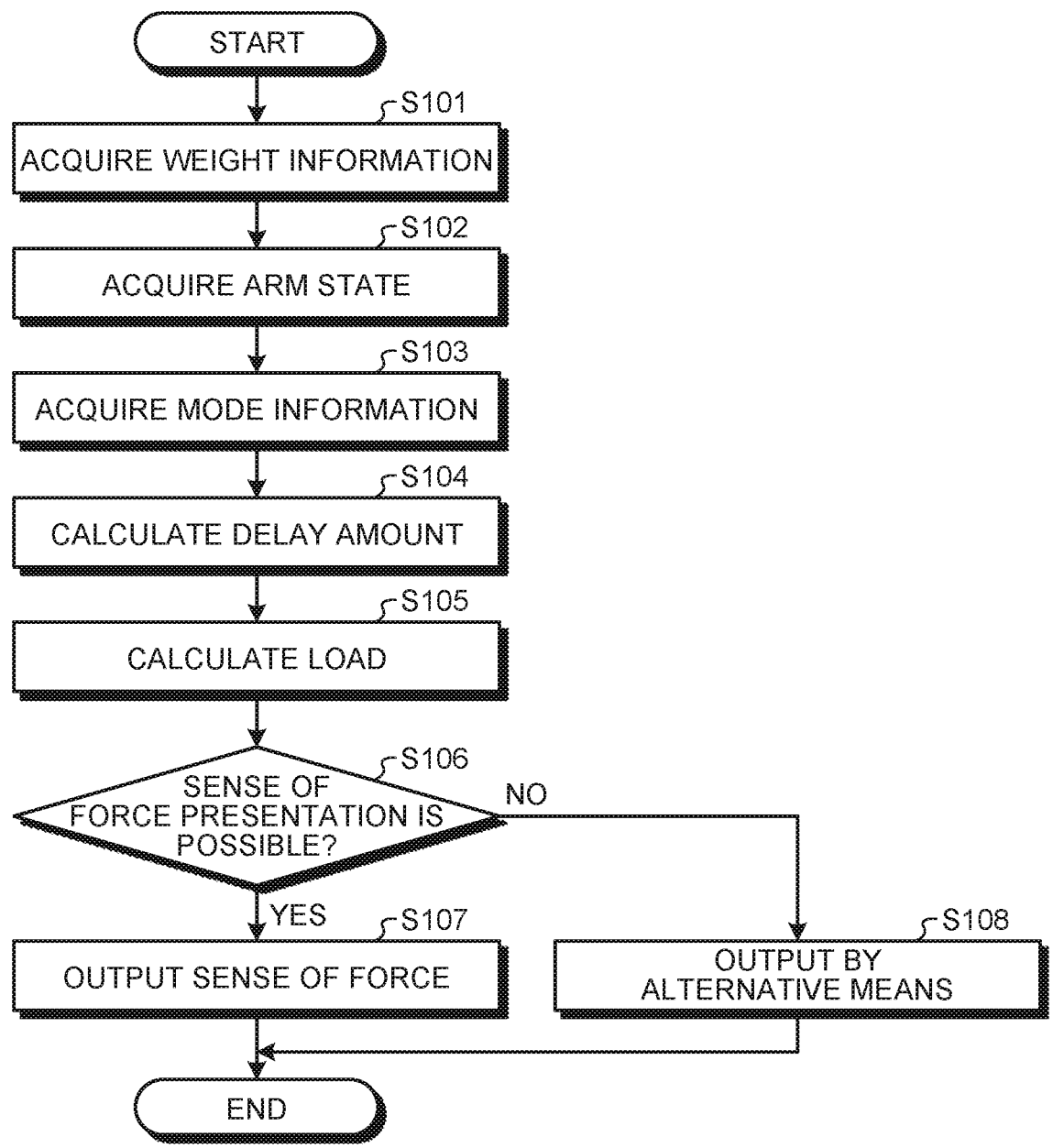
FIG. 25 is a flowchart of a control method according to the embodiment of the present disclosure.

Next, an example of a control method according to the present embodiment is explained with reference to FIG. 25. FIG. 25 is a flowchart of the control method according to the present embodiment. As illustrated in FIG. 25, a distance measuring method according to the present embodiment can mainly include a plurality of steps of step S101 to step S108. Details of the steps according to the present embodiment are explained below.

First, the presentation system 1 acquires, for example, weight information as attribute information of the virtual object 900 (step S101). Next, the presentation system 1 acquires a state of the arm 806 of the user 800 (step S102). Then, the presentation system 1 acquires a type (mode information) of a motion (pinch, push, or the like) of the user 800 (step S103).

Subsequently, the presentation system 1 calculates a delay amount based on the various kinds of information acquired in step S101 to step S103 explained above (step S104). Further, the presentation system 1 calculates, based on the delay amount calculated in step S104 explained above, a load amount of a sense of force given by the sense-of-force device 20 (step S105).

Then, the presentation system 1 determines whether the load amount calculated in step S105 explained above can be presented by the sense-of-force device 20 (step S106). When determining that the calculated load amount can be presented by the sense-of-force device 20 (step S106: Yes), the presentation system 1 proceeds to step S107. When determining that the calculated load amount cannot be presented by the sense-of-force device 20 (step S106: No), the presentation system 1 proceeds to step S108.

The presentation system 1 outputs control information to the sense-of-force device 20 and presents a sense of force (step S107). On the other hand, the presentation system 1 outputs the control information to a device that can present another modal and presents the other modal as an alternative to the sense of force (step S108).

3. Summary

As explained above, according to the embodiment of the present disclosure, a delay is added to the movement of the virtual object 900 based on the movement of the finger 804 of the user 800 and sense of force presentation, display, and vibration presentation are performed based on the movement of the virtual object 900 to which the delay is added. According to the present embodiment, by adding the delay in this way, a sense of force, a visual sense, or the like of the virtual object 900 simulatively sinking into the finger 804 of the user 800 is given. Therefore, the user 800 can feel the gravity acting on the virtual object 900. As a result, according to the present embodiment, it is possible to improve the reproducibility of the reality of the virtual object 900.

Note that, in the embodiment explained, it is explained that the virtual object 900 is operated by the hand 802 of the user 800. However, in the present embodiment, the user operation is not limited to the operation by the hand 802. In the present embodiment, for example, the user operation may be an operation for operating the virtual object 900 with a robot hand (a real object or the robot hand itself may be a virtual object) remotely operated by the user 800 or an operation interface (such as a stick-like controller) carried by the user 800.

For example, in the case of a stick-like controller, when the tip of the controller virtually comes into contact with the virtual object 900 or enters a range of a predetermined distance from the virtual object 900, the virtual object 900 may be moved by the controller. In the case of such a controller, it is assumed that a sense of force or vibration can be given to the user 800 via the controller.

In the embodiment of the present disclosure, when a tablet (not illustrated) or a smartphone (not illustrated) is used as the display device 10, vibration may be applied to the user 800 by a tablet terminal or the like as an alternative to the sense of force

4. Hardware Configuration

Figure 26:
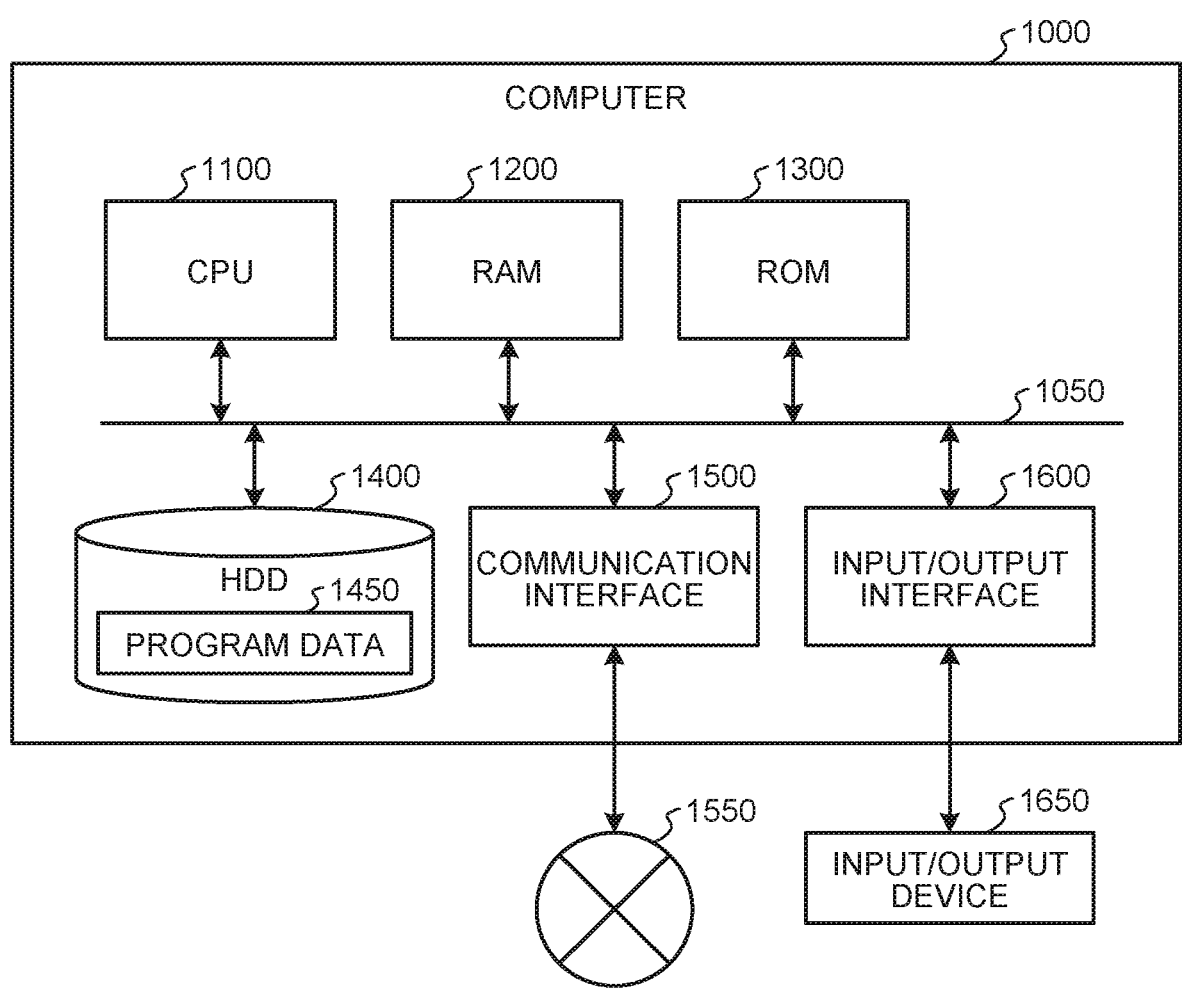
FIG. 26 is a hardware configuration diagram illustrating an example of a computer that implements functions of the control device 40.

The control device 40 according to the embodiment of the present disclosure explained above may be implemented by, for example, a computer 1000 having a configuration illustrated in FIG. 26 connected to the display device 10, the sense-of-force device 20, and the camera 30 via the network 50. FIG. 26 is a hardware configuration diagram illustrating an example of a computer that implements the functions of the control device 40. The computer 1000 includes a CPU 1100, a RAM 1200, a ROM (Read Only Memory) 1300, an HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a BIOS (Basic Input Output System) executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records a distance measuring program according to the present disclosure that is an example of the program data 1450.

The communication interface 1500 is an interface for the computer 1000 to be connected to an external network 1550 (for example, the Internet). For example, the CPU 1100 can control the sense-of-force device 20 via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, when the computer 1000 functions as the control device 40 according to the embodiment of the present disclosure, the CPU 1100 of the computer 1000 realizes the function of the main control unit 400 by executing a program loaded on the RAM 1200. The HDD 1400 stores a control program and the like according to the embodiment of the present disclosure. Note that the CPU 1100 reads the program data 1450 from the HDD 1400 and executes the program data. However, as another example, the CPU 1100 may acquire these programs from another device via the external network 1550.

The control device 40 according to the present embodiment may be applied to a system including a plurality of devices based on connection to a network (or communication among devices) such as Cloud computing.

5. Supplement

Note that the embodiment of the present disclosure explained above can include, for example, an information processing method executed by the information processing apparatus or the information processing system explained above, a program for causing the information processing apparatus to function, and a non-transitory tangible medium in which the program is recorded. The program may be distributed via a communication line (including wireless communication) such as the Internet.

The steps in the information processing method in the embodiment of the present disclosure explained above may not always be processed according to the described order. For example, the steps may be processed with the order changed as appropriate. The steps may be partially processed in parallel or individually instead of being processed in time series. Further, the processing of the steps may not always be processed according to the described method and may be processed by, for example, another functional unit according to another method.

The preferred embodiment of the present disclosure is explained in detail above with reference to the accompanying drawings. However, the technical scope of the present disclosure is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure.

The effects described in the present specification are only explanatory or illustrative and are not limiting. That is, the technique according to the present disclosure can achieve other effects obvious for those skilled in the art from the description of the present specification together with or instead of the effects described above.

For example, a component explained as one device may be divided and configured as a plurality of devices. Conversely, components explained above as a plurality of devices may be collectively configured as one device. It is a matter of course that components other than those explained above may be added to the components of the devices. Further, if a configuration and an operation of an entire system are substantially the same, a part of a configuration of a certain device may be included in a configuration of another device. Note that the system explained above means a set of a plurality of components (devices, modules (components), and the like). It does not matter whether all the components are present in the same housing. Therefore, a plurality of devices housed in separate housings and connected via a network and one device in which a plurality of modules are housed in one housing are both grasped as a system.

Note that the present technique can also take the following configurations.

(1) An information processing apparatus comprising:
   an information acquisition unit that acquires operation information concerning user operation performed on a virtual object superimposed and displayed on a real space or a virtual space; and
   a sense of force control unit that outputs, based on the operation information, via a sense-of-force device attached to a part of a body of a user, a sense of force for causing the user to recognize weight.

(2) The information processing apparatus according to (1), further comprising an effect control unit that gives, based on the operation information, an effect of causing the user to recognize the weight to the virtual object.

(3) The information processing apparatus according to (2), wherein, as the effect, the effect control unit adds a delay to movement of the virtual object based on the user operation.

(4) The information processing apparatus according to (3), wherein
   the operation information includes:
   operation position information indicating a relative position of the user operation to the virtual object; and operation direction information indicating a direction of the user operation applied to the virtual object.

(5) The information processing apparatus according to (4), wherein the operation position information is information concerning a position of a part of a body of the user capable of virtually coming into contact with the virtual object with respect to the virtual object.

(6) The information processing apparatus according to (4) or (5), wherein
   the sense of force control unit
   applies,
   via the sense-of-force device,
   a first load having a direction opposite to a direction of the user operation to the user and
   subsequently applies a second load having a same load amount as a load amount of the first load and a direction opposite to a direction of the first load to the user.

(7) The information processing apparatus according to any one of (3) to (6), wherein
   the information acquisition unit acquires attribute information of the virtual object, and
   the effect control unit determines a delay amount of the delay based on the attribute information.

(8) The information processing apparatus according to (7), wherein the effect control unit determines the delay amount based on volume information given to the virtual object as the attribute information.

(9) The information processing apparatus according to (7), wherein the effect control unit determines the delay amount based on weight information given to the virtual object as the attribute information.

(10) The information processing apparatus according to (7), wherein the effect control unit determines the delay amount based on color information given to the virtual object as the attribute information.

(11) The information processing apparatus according to any one of (4) to (6), wherein the effect control unit determines a delay amount of the delay based on a direction of the user operation.

(12) The information processing apparatus according to any one of (3) to (6), wherein
   the information acquisition unit acquires information concerning a state of the user operation, and
   the effect control unit determines a delay amount of the delay based on the state of the user operation.

(13) The information processing apparatus according to (12), wherein
   the part of the body of the user is a hand of the user, and
   the information acquisition unit acquires information concerning a state of an arm corresponding to the hand as information concerning the state of the user operation.

(14) The information processing apparatus according to any one of (3) to (6), wherein
   the information acquisition unit acquires environment information concerning an environment of the real space or the virtual space, and
   the effect control unit determines a delay amount of the delay based on the environment information.

(15) The information processing apparatus according to any one of (7) to (14), wherein the effect control unit adds, as the effect, a delay obtained by applying smoothing processing to the movement of the virtual object.

(16) The information processing apparatus according to any one of (7) to (15), wherein, when a load amount based on the determined delay amount exceeds a movable range of the sense-of-force device, the effect control unit controls a device that presents another modal.

(17) The information processing apparatus according to any one of (3) to (16), wherein the effect control unit controls, via a display device, the movement of the virtual object involving the delay.

(18) The information processing apparatus according to any one of (3) to (17), wherein the effect control unit presents vibration to the user via a vibration device loaded on the sense-of-force device or an operation device held by the user.

(19) An information processing method, by an information processing apparatus, comprising:
   acquiring operation information concerning user operation performed on a virtual object superimposed and displayed on a real space or a virtual space; and
   outputting, based on the operation information, via a sense-of-force device attached to a part of a body of a user, a sense of force for causing the user to recognize weight.

(20) An information processing system comprising:
   an information acquisition device that acquires operation information concerning user operation performed on a virtual object superimposed and displayed on a real space or a virtual space; and a sense of force control device that outputs, based on the operation information, via a sense-of-force device attached to a part of a body of a user, a sense of force for causing the user to recognize weight.

REFERENCE SIGNS LIST

1 PRESENTATION SYSTEM
10 DISPLAY DEVICE
20 SENSE-OF-FORCE DEVICE
30 CAMERA
40 CONTROL DEVICE
50 NETWORK
200 MOVABLE UNIT
202 MOTOR
204 ENCODER
206 COMMUNICATION UNIT
400 MAIN CONTROL UNIT
402 INFORMATION ACQUISITION UNIT
404 EFFECT CONTROL UNIT
406 DISPLAY CONTROL UNIT
408 SENSE-OF-FORCE DEVICE CONTROL UNIT
410 VIBRATION CONTROL UNIT
412 OUTPUT UNIT
420 COMMUNICATION UNIT
430 STORAGE UNIT
800 USER
802 HAND
804 FINGER
806 ARM
900, 900a, 900b, 900c VIRTUAL OBJECT
902 MIDPOINT

The invention claimed is:

1. An information processing apparatus, comprising:
a processor configured to:
acquire operation information corresponding to a user operation on a virtual object, wherein the virtual object is superimposed and displayed on a one of real space or a virtual space;
acquire attribute information of the virtual object, wherein the attribute information corresponds to volume information of the virtual object;
determine a delay amount of a delay in movement of the virtual object, wherein the determination of the delay amount is based on the attribute information; and
output, based on the determined delay amount, via a sense-of-force device attached to a part of a body of a user, a sense of force that causes the user to recognize weight of the virtual object.

2. The information processing apparatus according to claim 1, wherein the processor is further configured to control, based on the operation information and the determined delay amount, an effect that causes the user to recognize the weight of the virtual object.

3. The information processing apparatus according to claim 2, wherein, as the effect, the processor is further configured to add the delay to the movement of the virtual object based on the user operation.

4. The information processing apparatus according to claim 3, wherein the processor is further configured to determine the delay amount of the delay based on weight information of the virtual object as the attribute information.

5. The information processing apparatus according to claim 3, wherein the processor is further configured to determine the delay amount of the delay based on color information of the virtual object as the attribute information.

6. The information processing apparatus according to claim 3, wherein the processor is further configured to:
acquire information corresponding to a state of the user operation, and
determine the delay amount of the delay based on the state of the user operation.

7. The information processing apparatus according to claim 6, wherein
the part of the body of the user is a hand of the user, and
the processor is further configured to acquire information corresponding to a state of an arm of the hand as the information corresponding to the state of the user operation.

8. The information processing apparatus according to claim 3, wherein the processor is further configured to:
acquire environment information corresponding to an environment of one of the real space or the virtual space, and
determine the delay amount of the delay based on the environment information.

9. The information processing apparatus according to claim 3, wherein
the processor is further configured to add, as the effect, the delay to the movement of the virtual object, and
the delay is based on application of a smoothing process to the movement of the virtual object.

10. The information processing apparatus according to claim 3, wherein, in a case where a load amount based on the determined delay amount of the delay exceeds a movable range of the sense-of-force device,
the processor is further configured to control a specific device that is different from the sense-of-force device and that presents a modal different from a modal presented by the sense-of-force device.

11. The information processing apparatus according to claim 3, wherein the processor is further configured to control, via a display device, the movement of the virtual object involving the delay.

12. The information processing apparatus according to claim 3, wherein the processor is further configured to present vibration to the user via one of a vibration device loaded on the sense-of-force device or an operation device held by the user.

13. The information processing apparatus according to claim 3, wherein the operation information includes:
operation position information indicating a relative position of the user operation to the virtual object; and
operation direction information indicating a direction of the user operation applied to the virtual object.

14. The information processing apparatus according to claim 13, wherein the processor is further configured to:
apply, via the sense-of-force device, a first load having a specific load amount and a direction opposite to the direction of the user operation-to the user; and
apply, via the sense-of-force device, a second load having the specific load amount and a direction opposite to the direction of the first load.

15. The information processing apparatus according to claim 13, wherein the processor is further configured to determine the delay amount of the delay based on the direction of the user operation.

16. The information processing apparatus according to claim 13, wherein the operation position information is information corresponding to a position of the part of the body of the user, which virtually comes into contact with the virtual object, with respect to the virtual object.

17. An information processing method, comprising:
- acquiring operation information corresponding to a user operation on a virtual object, wherein the virtual object is superimposed and displayed on one of a real space or a virtual space;
- acquiring attribute information of the virtual object, wherein the attribute information corresponds to volume information of the virtual object;
- determining a delay amount of a delay in movement of the virtual object, wherein the determination of the delay amount is based on the attribute information; and
- outputting, based on the determined delay amount, via a sense-of-force device attached to a part of a body of a user, a sense of force that causes the user to recognize weight of the virtual object.

18. An information processing system, comprising:
a processor configured to:
- acquire operation information corresponding to a user operation on a virtual object, wherein the virtual object is superimposed and displayed on a real space or a virtual space;
- acquire attribute information of the virtual object, wherein the attribute information corresponds to volume information of the virtual object;
- determine a delay amount of a delay in movement of the virtual object, wherein the determination of the delay amount is based on the attribute information; and
- output, based on the determined delay amount, via a sense-of-force device attached to a part of a body of a user, a sense of force that causes the user to recognize weight of the virtual object.

\* \* \* \* \*